United States Patent
Jones

(10) Patent No.: US 8,025,859 B2
(45) Date of Patent: Sep. 27, 2011

(54) PROCESS FOR GOLD AND SILVER RECOVERY FROM A SULPHIDE CONCENTRATE

(75) Inventor: David L. Jones, Delta (CA)

(73) Assignee: CESL Limited, Vancouver (CA)

( * ) Notice: Subject to any disclaimer, the term of this patent is extended or adjusted under 35 U.S.C. 154(b) by 871 days.

(21) Appl. No.: 11/798,949

(22) Filed: May 18, 2007

(65) Prior Publication Data

US 2008/0286180 A1 Nov. 20, 2008

(51) Int. Cl.
C22B 11/00 (2006.01)

(52) U.S. Cl. ............ 423/30; 423/26; 205/569; 205/570; 75/744

(58) Field of Classification Search .................... 423/26, 423/30; 205/569, 570; 75/744
See application file for complete search history.

(56) References Cited

U.S. PATENT DOCUMENTS

| | | | |
|---|---|---|---|
| 4,188,208 | A | 2/1980 | Guay |
| 4,338,168 | A | 7/1982 | Stanley et al. |
| 4,438,076 | A | 3/1984 | Pietsch et al. |
| 4,559,209 | A | 12/1985 | Muir et al. |
| 4,578,163 | A | 3/1986 | Kunter et al. |
| 5,645,708 | A | 7/1997 | Jones |
| 5,902,474 | A | 5/1999 | Jones |
| 6,746,512 | B1 | 6/2004 | Shaw |
| 2003/0192404 | A1 | 10/2003 | Jones |
| 2006/0185475 | A1 * | 8/2006 | Hourn et al. ................ 75/735 |

FOREIGN PATENT DOCUMENTS

| | | |
|---|---|---|
| CA | 928083 | 6/1973 |
| CA | 1190750 | 7/1985 |
| CA | 1215843 | 12/1986 |
| CA | 2204424 | 11/1997 |
| CN | 85109224 A | 9/1986 |
| CN | 1096057 | 12/1994 |
| CN | 1656238 A | 8/2005 |
| GB | 728 135 A | 4/1955 |
| RU | 2 229 529 C2 | 5/2004 |

OTHER PUBLICATIONS

Written Opinion and International Search Report, PCT/CA2008/000954 dated Aug. 27, 2008.

Bruckard, W.J. et al., "Platinum, Palladium, and Gold Extraction from Coronation Hill ore by Cyanidation at Elevated Temperatures", Hydrometallurgy, vol. 30, No. 1-3, Jun. 1992, pp. 211-227.
Fahrenwald, A.W., "Some Studies on the Gold-Dissolution Rate in Cyanide Solutions—Investigation of the Effect of Certain Variables", Engineering and Mining Journal, vol. 140, No. 1, pp. 44-47, 1993.
Henderson, Wayne C., "Preliminary Equipment Cost Estimate—1000 STPD LTLP Pressure Cyanidation Plant", http://www.dynaresource.com/DynaResource.htm, 1994.
Kuczynski, R.J., "High Temperature Cyanide Leaching of Platinum-Group Metals from Automobile Catalysts—Process Development Unit", US Bureau of Mines, USGPO: 1992-611 -007/60071, 1992.
Muir, C.W.A., "The Treatment of Refractory Gold-Bearing Flotation Concentrates Using Pressure Leaching Techniques", Proceedings from MetSoc Conference in Los Angeles, US, 1984, pp. 310-322.
"Cyanidation of Gold Ores—Cyanide Regeneration", pp. 164-165, sent to CESL by Juris Harlamovs, 1998.
Tronev, V.G., "On the Solubility of Precious Metals at High Pressure Part II. The Dissolution of Gold in Cyanide Under Air Pressure", Comptes Rendus (Doklady) de d'Academie des Sciences de l'URSS, vol. 16, No. 5, pp. 281-284, 1986.
Randol International Ltd, "Pressure Cyanidation", Gold & Silver Recovery Innovations Phase III, vol. 2, Randol International Ltd., Golden, CO, USA, Apr. 2, 1987—Pressure Cyanidation section, pp. 1292-1318.
Randol International Ltd, "Pressure Cyanidation", Gold & Silver Recovery Innovations Phase III, vol. 4, Randol International Ltd., Golden, CO, USA, Apr. 2, 1987—Pressure Cyanidation section, pp. 2186-2192.
The European Search Report dated Nov. 29, 2010, issued in respect of corresponding European Application No. 08748331.9.
Office Action dated Jan. 26, 2011, issued in respect of the corresponding Chinese Application No. 200880016293.5.

* cited by examiner

*Primary Examiner* — Steven Bos
(74) *Attorney, Agent, or Firm* — Geoffrey deKleine; Borden Ladner Gervais LLP

(57) ABSTRACT

A process for the extraction of a precious metal, such as gold or silver, from a sulphide ore or concentrate or other source material comprises subjecting the source material to pressure oxidation to produce a pressure oxidation slurry. The pressure oxidation slurry is flashed down to a lower temperature and pressure and is then subjected to a liquid/solid separation to obtain a pressure oxidation solution and a solid residue containing the precious metal. The solid residue is then subjected to cyanidation to extract the precious metal. The formation of thiocyanide during cyanidation is minimized or counteracted by effecting the cyanidation at an elevated oxygen pressure and a reduced retention time, such as 30 to 90 minutes. A method for the reduction of copper cyanide formation during cyanidation leaching is also provided.

55 Claims, 4 Drawing Sheets

PROCESS FOR GOLD AND SILVER RECOVERY FROM A SULPHIDE CONCENTRATE

FIELD OF THE INVENTION

This invention relates to a process for the recovery of precious metals, such as gold, silver and the platinum group metals, from sulphide concentrates or ores or other source material.

BACKGROUND OF THE INVENTION

The applicant has developed a hydrometallurgical process for the treatment of copper concentrate so as to produce refined cathode copper by an efficient and environmentally clean process. This process is known as the "CESL™ copper process" and embodiments of the process are described in U.S. Pat. No. 5,645,708 (the '708 patent) the entire contents of which is incorporated herein by reference.

The process as described in the '708 patent in broad terms comprises subjecting the copper concentrate to pressure oxidation in the presence of an acidic chloride solution to produce a solid containing, inter alia, a basic copper salt and a pressure oxidation solution, containing copper in solution depending on the nature of the concentrate and the pH during pressure oxidation. The solid containing the basic copper salt may be subjected to a subsequent acid leaching step, typically at atmospheric pressure, to leach the basic copper salt into solution, thereby obtaining a copper solution which is treated, along with the pressure oxidation solution (should it contain recoverable amounts of copper in solution) to copper solvent extraction and electrowinning to produce cathode copper.

While the CESL copper process as described in the '708 patent, is suitable for the treatment of different copper concentrate compositions, various improvements, modifications or extensions to the process were made to further accommodate different copper concentrate compositions, as well as to provide for the recovery of other metals, such as zinc, cobalt, nickel and precious metals, where these occur in the copper concentrate, or without copper being present in the concentrate. Some of these modifications which pertain particularly to the recovery of precious metals are described in applicant's U.S. Pat. No. 5,902,474 (the '474 patent), the entire contents of which is incorporated herein by reference.

The present invention is concerned with the recovery of precious metals. It is significantly different from the process as described in the '474 patent and has the advantage of being simpler than the earlier process with overall lower costs.

Cyanidation of gold and silver ores is generally carried out in air at ambient pressure. Oxygen is needed in the process, but usually the amount needed is so small that it is adequately supplied by ambient air, which of course contains about 21% oxygen.

Equipment and conditions for cyanidation in commercial plants include:

(a) Agitated (open) tanks, in which the ore is slurried up in a cyanide solution usually with high percentage solids, and leached with free access of air from the surface. The ore must first be crushed and ground to allow it to be suspended by agitation. Several types of agitation have been used including mechanical agitation and air agitation (pachucas).

(b) Retention times are generally 1-3 days. Agitated tanks are used for ores that are relatively high grade in gold or silver, as this method produces better recovery than heap leaching, albeit at higher operating and capital cost. Sparging of air can be done to increase flow of oxygen into the slurry, but that generally increases the loss of expensive hydrogen cyanide into the offgas. Sparging of pure oxygen into the slurry is also known, as is the addition of other reagents such as liquid hydrogen peroxide to accelerate leaching.

(c) Large heaps of crushed ore, which are leached in place by cyanide solution that is sprayed onto or dripped over the surface of the heap. This low cost process is used for low grade ores and takes place over a longer period time of time, generally several months. Air ingress to the heaps by natural processes such as convection is generally sufficient for cyanidation to proceed at an acceptable rate.

With pressure cyanidation of gold and silver ores, oxygen is applied at elevated pressures, i.e. higher than oxygen partial pressure in air at atmospheric pressure, to agitated slurry.

The use of elevated oxygen pressure generally increases the leaching rate of gold and silver. Cyanide leaching is believed to involve oxygen as a reagent, as in the familiar Elsner equation:

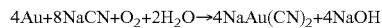
$$4Au + 8NaCN + O_2 + 2H_2O \rightarrow 4NaAu(CN)_2 + 4NaOH$$

Although the exact stoichiometry of the reaction may be in doubt, (e.g. hydrogen peroxide has been proposed as an intermediate product and reagent), most observers agree that the overall reaction includes oxygen as a reagent.

A similar equation can be written for silver, and with substitution of alternative cyanide reagents, such as KCN instead of NaCN.

Despite several disclosures in the literature of pressure cyanidation processes over many years, commercial application to date has been scarce. Perhaps this is because the obvious advantages of the improved leaching kinetics may be outweighed by the higher capital costs for such a process, with normal gold and silver ores.

However, the inventor is aware of two commercial plants that were built and operated and include pressure cyanidation, namely the Consolidation Murchison plant in South Africa and the Calmet process developed by Calmet of Colorado, USA.

The process employed at Consolidated Murchison was specifically designed to treat some high grade refractory gold concentrates containing arsenic and/or antimony. These rather unusual feed materials required much lower pH conditions than normal, i.e. pH<10, with much higher cyanide concentrations than normal, to obtain satisfactory leaching. Under these low pH conditions cyanide consumption would be very high, using conventional cyanidation (in open tanks) at ambient pressure, because of the excessive volatilization of HCN gas, which increases rapidly with decreasing pH, and also because of the high levels of cyanide needed with this unusual feed material. The process developed at Consolidated Murchison resulted in a commercial plant which satisfactorily resolved these difficulties.

The Consolidation Murchison plant reportedly uses a pipe reactor, operating in batch mode with recirculating slurry, at pH 10 or less, with high cyanide concentrations, and obtains 80-90% gold recovery with acceptable cyanide consumption.

This process is specifically designed for the feed materials on hand at this site, i.e. containing stibnite (Sb sulphide) and arsenopyrite minerals, which requires the low pH, at least low in comparison the usual pH 12 employed elsewhere at this site.

The process of the present invention, as will become apparent below, is capable of dealing with a residue from a copper leach process which has specific components, namely elemental sulphur and cyanide-soluble copper which would otherwise consume large amounts of cyanide with conventional cyanidation processes. In the present invention pressure cyanidation for this feed material is designed to limit thiocyanate production by operating at unusually low retention times. The process of the present invention is not limited to low pH, and the normal pH range is 10-11, but is not limited to this range. The present invention therefore overcomes a different problem than is dealt with by the Consolidated Murchison process.

The Calmet process on the other hand is a combined pressure oxidation and pressure cyanidation process, and was used for a variety of gold containing concentrates including tellurides, sulphides and carbonaceous preg-robbing materials.

Details of the process are scarce, but it seems that pressure oxidation of sulphides in low pH solution was combined with pressure cyanidation of the gold and silver.

It used an agitated autoclave operated in batch mode, in contrast to the pipe reactor at Consolidated Murchison, with a reported capacity of 15-30 tpd concentrate. It was built in Colorado in the 1980's evidently, but apparently closed down a few years later.

The objective of the Calmet process was to treat refractory but high grade gold-silver materials in a one-step pressure oxidation, which simultaneously oxidized sulphides and leached gold and silver. This is different from the present invention, in which pressure oxidation and leaching of base metals, such as copper, if present, is effected first in a separate operation, and the residue from this operation is then subsequently treated for precious metals recovery, as will be described in more detail below.

Gold and silver often occur as trace elements associated with copper in nature, such as in copper sulphide ores. Such ores typically contain 0.3% to 2% Cu, and are usually first subjected to milling and flotation to produce a concentrate of about 30% Cu, which is sufficient to make the subsequent smelting process efficient.

Gold and silver generally follow the copper into the concentrate in fairly high yield, and although they are minor constituents of such copper concentrates, frequently there is enough gold and silver present to be economically significant. Typically, the value of the gold and silver is about 10% of the value of the copper in the concentrate, although this varies widely from one concentrate to another. Rarely is the combined gold and silver content so low as to be negligible.

Occasionally, the combined value of gold and silver in such concentrates is actually higher than the copper, and thus the concentrate is more properly termed a gold or silver concentrate.

When copper sulphide concentrates containing gold and silver are processed by smelting and refining, these metals are generally recovered in high yield from the concentrates (about 90-98%). The extra cost to the copper smelter/refinery of such precious metal recovery is quite low, (incremental to the copper smelter/refining cost itself). The precious metals follow the copper through the various steps of matte smelting and converting to blister copper. The blister copper is then usually refined by electrolysis to remove impurities and during this refining process precious metals report almost quantitatively to the (refinery) anode slime, which has a low mass, (typically only a few kg per tonne of Cu metal). The anode slime therefore has a high concentration of the precious metals relative to the original copper concentrate fed to the smelter, e.g. 1000 to 3000 times more concentrated. Such low mass and high concentrations of gold and silver in the slime lead to low processing costs for final recovery and refining of the precious metals.

The monetary returns from such precious metals in concentrate processed in a smelter are economically significant, and any alternative process for sulphide concentrates (competing with the smelters), must take this into consideration. Smelters will generally pay at least 90% of the value of the gold if there is at least 1 g Au per tonne concentrate. For silver the minimum for payment is about 15-30 g/t. Probably over 85% of copper concentrates traded worldwide have at least this much gold and/or silver, so there is a significant credit for such values when the concentrate payment terms are negotiated between seller and buyer. Typically this credit amounts to about 10% of the value of the concentrate, and generally the gold value is about 80-90% of this, with silver making up the remainder.

Turning to a hydrometallurgical copper recovery process, such as the process described in the '708 patent, if gold and silver are not recovered efficiently along with copper, then the overall economics of the process could be adversely affected in comparison with smelting, even fatally for some concentrates which are particularly rich in gold and silver.

Gold and silver generally do not leach to any significant extent in a hydrometallurgical copper process, and are therefore left almost quantitatively in the residue after recovery of base metals. Therefore, any recovery process for precious metals must be an additional or subsequent step(s) processing such residue, which still has a mass of about 80% of the original concentrate. Concentrations of gold and silver in such residue are only slightly higher therefore in this residue, and still quite low, for example 6 g/t Au and 60 g/t Ag.

In comparison, as mentioned above, anode slimes produced by the smelting and refining process are greatly upgraded from the original concentrate. Thus a typical Cu concentrate with say 5 g/t Au and 50 g/t Ag, might have about 15,000 g/t Au and 150,000 g/t Ag in the slimes that need to be refined.

The challenge to the hydrometallurgical process is the efficiency or economics of the process. Treating such a large mass to recover only small amounts of precious metals at low cost (specifically a cost that is low in comparison to the value of the precious metal content in the residue) is clearly a difficult process to design.

It is possible to leach many gold and silver ores that have very low grades, (even lower than the typical residues of 6 g/t Au and 60 g/t Ag given above), using the well-established cyanide leach process, often with excellent results and low costs. The low concentrations of cyanide necessary to leach gold and silver, and the very low consumption of such cyanide with many such ores, together with the conditions, (ambient temperature and pressure, low corrosion conditions, etc), leads to exceptionally low operating costs for many gold and silver ores, (in terms of $/t ore). This enables ores to be economically treated when the gold content for instance is only 1 g/t Au. Often the cyanide consumptions are less than 0.25 kg NaCN per tonne ore, the cost of which is small compared to the value of gold recovered.

However, the residue generated by a hydrometallurgical process when copper sulphide concentrates are treated has unusual characteristics in regard to cyanidation (compared to naturally occurring ores) which can greatly increase the cost of the process, even to the point of making it uneconomic.

The copper residue contains two components in particular which tend to consume very large amounts of cyanide, i.e. copper and sulphur, when the residue is leached under "standard" cyanide leach conditions, i.e. leaching with dilute(alkaline)sodium cyanide solution at ambient temperature and pressure for 1 to 3 days.

Firstly, the residue still has a significant copper content, despite the fact that it has already been processed specifically for copper extraction. For example, the CESL copper process is about 95-98% efficient for Cu extraction, and thus the residue typically contains 1.2-1.8% Cu. This remaining Cu content is partly (15-25%) soluble in standard cyanide leach conditions, leading to the formation of soluble copper cyanide compounds, such as $Na_3Cu(CN)_4$, as well as other cyanide compounds such as sodium cyanate, NaCNO.

Also present in the residue is elemental sulphur which is a by-product of the CESL copper process and typically constitutes 25-35% of the residue. The elemental sulphur also reacts partly with cyanide solutions leading to the formation of thiocyanate compounds, such as NaSCN.

Both of these phenomena lead to very high cyanide consumption with the residue of the CESL copper process, under the conditions of a standard cyanide leach, e.g. 30 kg NaCN consumed per tonne of copper residue, or more than 100 times the consumption typically experienced in leaching gold ores. Such levels of cyanide consumption render the process far too expensive in view of the modest value of gold and silver to be extracted.

At a typical cost of US$ 1.50 per kg NaCN, the cost of cyanide consumed is about $45/tonne of residue. It is worthwhile to consider the effect of such high cyanide consumption on the economics of a typical copper concentrate producing a residue by the CESL copper process.

Assuming a gold and silver content at say 6 g/t Au and 60 g/t Ag, this hypothetical residue has a gross metal value of about $140/tonne of residue, at current prices (time of writing, November 2006).

To the $45/t cyanide cost must be added other reagent costs, (lime and various reagents needed for cyanide destruction), which typically will be at least equal to the cyanide cost alone, leading to a total reagent cost in this case of about $90/tonne residue. Then there are the other necessary operating costs such as labor, energy, maintenance costs plus amortization costs for the capital investment. Typically reagent costs are only a fraction (e.g. 50%) of the total operating cost, so the overall operating cost might be $180/tonne residue, given the original assumption above of 30 kg cyanide/t residue. Thus the total operating costs are of the same order of magnitude as the gross metal value of the gold and silver, with this high cyanide consumption, which clearly renders the process uneconomic.

The total operating cost should not be more than 50% of the value of the metals recovered. Thus to make the process profitable for the example quoted above, (with say 90% recovery of the $140 gross value, i.e. $126), the total operating cost should be no more than $63/tonne residue. Using the assumptions above, the cyanide costs should be no more than 25% of the overall operating cost, or about $16/tonne residue which is equivalent to 10 kg NaCN/tonne residue, in this example.

Thus the typical cyanide consumption for a "standard" cyanide leach on a CESL copper process residue consumes at least 3 times more cyanide than is economically allowable. In addition, the gold and silver themselves cannot easily be extracted from the Cu process residue by cyanide leach solutions.

In summary, with standard cyanide leaching of the copper residue, costs are high, gold and silver recoveries are poor, and the costs of the process tend to outweigh the value of the recovered metals.

It is accordingly the purpose of the present invention to provide a simpler process for gold and silver recovery from sulphide concentrates or other source material which alleviates the above economic challenges.

SUMMARY OF THE INVENTION

According to one aspect of the invention there is provided a process for the extraction of a precious metal from a sulphide ore or concentrate or other feed material, comprising subjecting the feed material to pressure oxidation to produce a pressure oxidation slurry; subjecting the slurry to a liquid-solid separation step to obtain a pressure oxidation solution and a solid residue containing elemental sulphur and the precious metal; and subjecting the solid residue to cyanidation to leach the precious metal into solution, whereby the undesirable side effect of the formation of thiocyanate ions in solution during said cyanidation is minimized or counteracted by reducing the duration of the cyanidation relative to duration of conventional cyanidation which is typically 1 to 3 days, as indicated above, but still obtain acceptable precious metal recovery. This is achieved by effecting the cyanidation at an elevated oxygen pressure.

According to another aspect of the invention there is provided a process for the extraction of a precious metal from a sulphide ore or concentrate, comprising subjecting the ore or concentrate to pressure oxidation to produce a pressure oxidation slurry; subjecting the slurry to a liquid-solid separation step to obtain a pressure oxidation solution and a solid residue containing elemental sulphur and the precious metal; and subjecting the solid residue to cyanidation, whereby formation of thiocyanate during said cyanidation is minimized or counteracted by effecting said cyanidation at an elevated pressure for a duration of a maximum of about 300 minutes.

The feed material may be a base metal sulphide ore or concentrate. The base metal may be a Cu, Ni and/or Co.

According to another aspect of the invention, the pressure oxidation is effected at an elevated temperature and pressure, i.e. above room temperature and atmospheric pressure, in the presence of an aqueous solution containing halide ions. The pressure oxidation is preferably carried out in a continuous fashion.

The pressure oxidation may be effected with an acidic solution containing about 4 to 25 g/L chloride.

According to a further aspect of the invention, the process comprises the step of flashing the pressure oxidation slurry down to a lower temperature and pressure. The flashing is preferably carried out in a continuous fashion.

According to another aspect of the invention, both the pressure oxidation and the flashing are carried out in a continuous fashion.

According to a further aspect of the invention, the solid residue containing the precious metal also contains elemental sulphur and the pressure oxidation is carried out at a temperature above the melting point of elemental sulphur and wherein the lower temperature to which the flashing of the slurry is effected, is below the melting point of elemental sulphur, e.g. about 95° C. to 102° C.

According to another aspect of the invention, the solid containing the elemental sulphur and the precious metal is subjected to cyanidation absent an intervening sulphur removal step.

The halide ions may be selected from one or more of the group consisting of chloride and bromide.

According to a further aspect of the invention, the ore or concentrate also contains copper, resulting in the solid residue from the pressure oxidation slurry also containing copper, and wherein the solid residue, prior to the cyanidation, is subjected to acid leaching with an acidic leach solution to dissolve as much as possible acid-soluble copper contained in the solid residue to produce a copper solution and a $2^{nd}$ solid residue with minimum content of the cyanide-soluble copper. The copper may be extracted from the copper solution by means of solvent extraction.

The acid leaching may be effected in the presence of a halide, e.g. about 2 to 10 g/L chloride.

According to another aspect of the invention, the acid leaching is effected at an elevated temperature, i.e. above room temperature, such as 40° C. to 95° C.

According to a further aspect of the invention, the acid leaching is effected with a retention time of about 0.5 to 4 hours, preferably 1 to 4 hours. The pH at which the acid leaching is effected is preferably pH 0.5 to pH 1.5 (or expressed as free acid in solution, as determined by titration to pH 4, about 5-25 g/L free acid as $H_2SO_4$), so as to minimize acid-soluble copper in the residue resulting from the acid leaching and thus minimize cyanide-soluble copper in the residue, as well. This pH or free acid concentration refers to the final or steady state concentration of the product solution from said acid leaching.

According to another aspect of the invention, the solid residue from the pressure oxidation slurry also contains elemental sulphur and the residue, prior to being subjected to cyanidation, is subjected to flotation to produce a solid concentrate containing the elemental sulphur and the precious metal and a tailings stream and thereafter subjecting the solid concentrate to cyanidation.

According to a further aspect of the invention the cyanidation is carried out at an elevated oxygen pressure in a pressure vessel with a retention time of about 30 to 180 minutes or 30 to 120 minutes or 30 to 90 minutes in the pressure vessel. The oxygen pressure may be from about 1000 to 10,000 kPag. A solid to liquid ratio (solids density), expressed as g/L solids, of about 100 to 600 g/L solids may be maintained during cyanidation.

According to another aspect of the invention, the cyanidation is carried out with sufficient cyanide to dissolve all cyanide-soluble copper in the solid residue, complex all such cyanide soluble copper as the tetracyano complex $[Cu(CN)_4]^{3-}$, compensate for other cyanide consuming reactions such as thiocyanate formation, and still have left over enough cyanide in the solution to have an active cyanide concentration of at least 500 ppm NaCN and up to 2000 ppm NaCN, the active cyanide concentration being total cyanide concentration in solution minus cyanide required for complexation of copper and any other similar base metals, such as zinc, if present.

According to a further aspect of the invention, the cyanidation is carried out at a maximum total cyanide concentration of 10,000 ppm or 1000 to 10,000 ppm NaCN, but preferably below 4000 ppm or 3000 to 4000 ppm NaCN.

According to another aspect of the invention, there is provided a method of minimizing thiocyanate formation during recovery of precious metal from a residue, containing the precious metal and sulphur, produced by a hydrometallurgical process, comprising the step of subjecting the residue to cyanidation to leach the precious metal into solution, whereby formation of thiocyanate during said cyanidation is minimized or counteracted by effecting said cyanidation at an elevated oxygen pressure so as to thereby reduce duration of the cyanidation while still leaching a major portion of the precious metal during said reduced duration of the cyanidation.

Further objects and advantages of the invention will become apparent from the description of preferred embodiments of the invention below.

BRIEF DESCRIPTION OF THE DRAWINGS

The invention will now be described by way of examples, with reference to the accompanying drawings. Specific details of certain embodiment(s) of the present apparatus/method are set forth in detailed description below and illustrated in the enclosed figures to provide an understanding of such embodiment(s). Persons skilled in the technology involved here will understand, however, that the present apparatus/method has additional embodiments, and/or may be practiced without at least some of the details set forth in the following description of preferred embodiment(s). In other instances, well known structures associated with the technology have not been described in detail to avoid unnecessarily obscuring the descriptions of the embodiments of the invention.

DETAILED DESCRIPTION OF THE PREFERRED EMBODIMENTS

Certain of the terms used in this specification are defined under Definition of Terms at the end of the specification.

Figure 1:
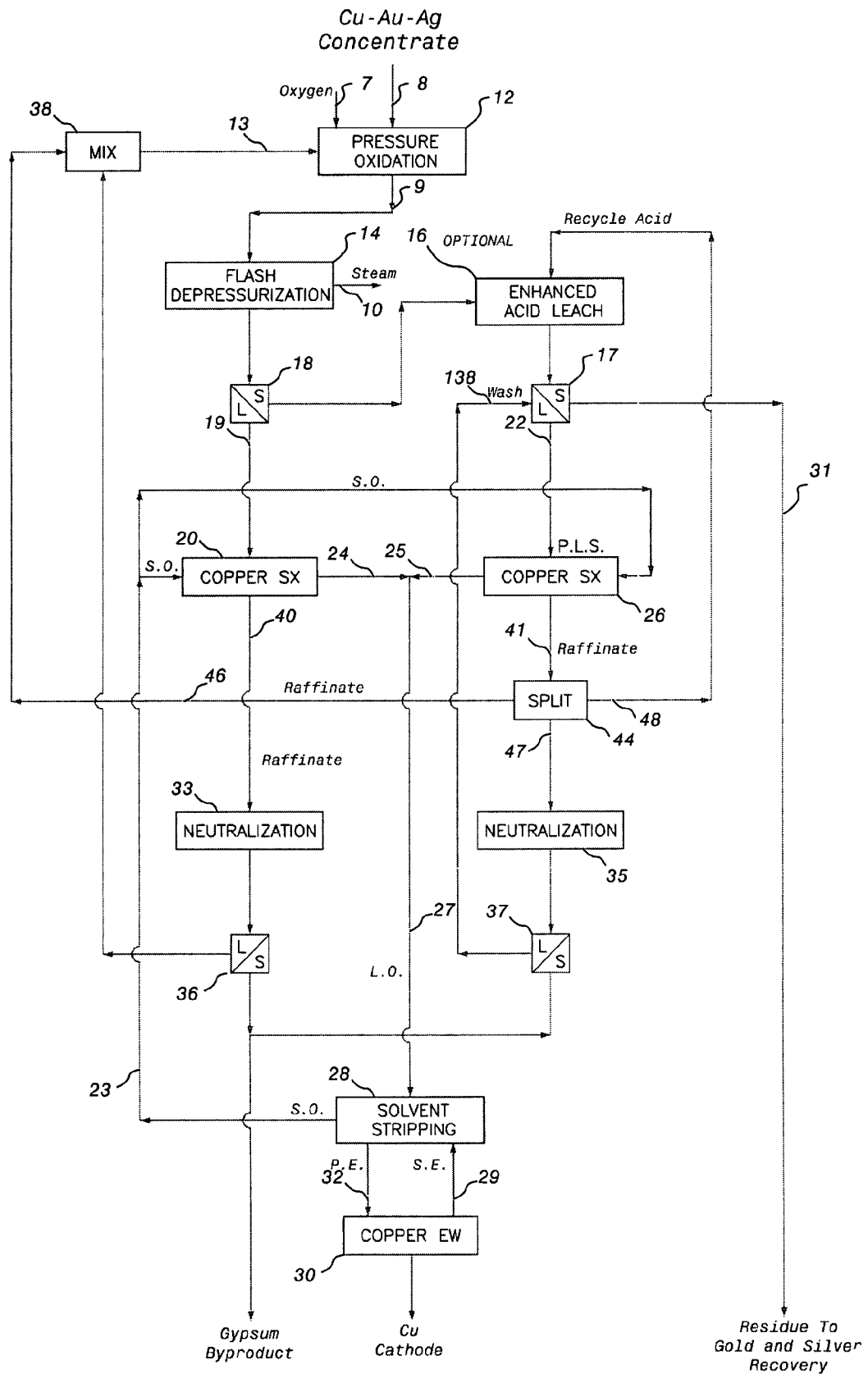
FIG. 1 is a flowsheet of a first part of a process for the recovery of copper as well as gold and silver.

FIG. 1 illustrates a first part of a process for the recovery of precious metal, as well as copper, from a feed material containing these metals, such as Cu—Au—Ag concentrate.

The concentrate is first subjected to pressure oxidation 12 to oxidize all Cu sulphide minerals, and, if present, any other sulphide minerals of other base metals such as Ni, Co and Zn. The pressure oxidation 12 takes place in the presence of oxygen and a chloride containing acidic solution under moderate conditions to oxidize the metals present in the sulphide minerals, such as Cu, Fe, Ni, Co and Zn (respectively to $Cu^{2+}$, $Fe^{3+}$, $Ni^{2+}$, $Co^{2+}$, $Zn^{2+}$), whilst minimizing oxidation of elemental sulphur to sulphate.

The pressure oxidation 12 takes place under conditions of elevated temperature and pressure, using high purity oxygen 7, in an agitated pressure vessel, such as an autoclave. The autoclave will typically be of horizontal design with the horizontal axis longer than the other two axes, which are usually equal, e.g. of round cross section. The autoclave typically will have several compartments, separated by weirs, so as to achieve plugged flow of slurry from the feed end to the discharge end. About three to six compartments are suitable. The first compartment may be larger than the rest to facilitate the heat balance in the autoclave, by allowing for a larger retention time in this compartment, and thus more heat is generated.

The reactions which take place during the pressure oxidation 12 are exothermic, and the heat generated is calculated to produce a rise in temperature sufficient to raise the temperature to the optimum temperature that will allow the desired reactions to occur at a rapid rate, i.e. achieve virtually complete reaction of the concentrate within about one hour.

As the reactions proceed, oxygen is consumed and if not replenished, the oxygen partial pressure would decline rapidly, which would be undesirable for complete pressure oxidation in the desired short retention time. Therefore, oxygen is fed into the autoclave continuously to maintain the pressure at the target pressure. The total pressure in the autoclave is the sum of oxygen and steam pressure and also pressure contributed by a small amount of other gases, such as non-condensables, e.g. nitrogen and argon, that may be introduced with the feed oxygen. The feed oxygen in practice is only about 97% pure, the rest being non-condensables, as mentioned.

It is also important to keep the fraction of oxygen in the gas phase (in the autoclave) at about 80% oxygen (molar basis). If the oxygen fraction is much less than 80%, the reactions are slowed down. During continuous operation of the pressure oxidation 12, the oxygen fraction will decline as other gases build up, as they are not reacted and are slowly added into the gas phase. Thus, non-condensable gases, such as nitrogen and argon (from the feed oxygen), and also carbon dioxide from reactions of carbonates in the copper concentrate will accumulate in the gas phase unless measures are taken to limit this build up.

To keep up the oxygen fraction in the gas phase, a small bleed of gas is removed on a continuous basis to reduce build up of these other gases. Typically about 10-20% of the feed oxygen flow, in volume terms, is bled out and exhausted from the autoclave. This bleed of gas represents a loss of oxygen so it is kept to a minimum. A reasonable compromise is thus made to keep up the fraction of oxygen at about 80% or more, and simultaneously minimize the bleed, which corresponds to a loss of about 15% of the feed oxygen.

The concentrate is generally at ambient temperature at the beginning of the process, e.g. from 5° C. to 30° C., depending on climate.

If necessary, or desired, the concentrate may be subjected to a prior grinding step to reduce the particle size to an optimum size range. Typically, the concentrate should have about 90-95% of the particles passing 400 mesh, i.e. 37 micron. Such grinding steps are common in the industry and further details are therefore considered necessary in this disclosure.

If the concentrate is in solid form, then it is first mixed with sufficient water to form a slurry 8 that can be pumped easily into the autoclave. Such a slurry is typically about 60-65% by weight solids.

This initial slurry 8 is then mixed with an aqueous solution (described below) and subjected to the pressure oxidation 12 in the autoclave. The process is best carried out continuously, so the aqueous solution and the concentrate are both pumped into the feed end of the autoclave continuously, and the product slurry discharged continuously from the other end of the autoclave to maintain a constant volume of slurry reacting in the autoclave at all times.

Typical conditions during the pressure oxidation 12 are:
(i) a temperature of about 125° C. to 160° C.;
(ii) a total pressure of about 1000 kPag to 1600 kPag (including steam and oxygen pressure, as well as pressure of minor content of other gases, such as nitrogen, argon and carbon dioxide);
(iii) a retention time in the autoclave of about 15-120 minutes;
(iv) about 100-300 g/L solids in the combined slurry (i.e. after mixing of the initial slurry with an aqueous solution);
(v) the final discharge slurry has pH of about 0.5-3.5; and
(vi) oxygen partial pressure is about 700 kPag to 1300 kPag.

The aqueous feed solution (stream 13 in FIG. 1) to the autoclave is generally recycled from other parts of the process, and contains typically about 5 to 20 g/L Cu, 4 to 25 g/L Cl and free acid as needed, but typically about 5-50 g/L ($H_2SO_4$). Additional fresh acid as $H_2SO_4$ is added to the recycle solutions to achieve the desired total free acid. At start up, sufficient hydrochloric acid is added to obtain the desired chloride concentration. The aqueous feed solution 13 also contains sulphate as needed to maintain the other components in solution. Thus the feed aqueous solution 13 (also termed "feed acid") is a mixture of copper, sulphate, chloride and hydrogen ions, in some combination. Other elements may be present due to recycling of the solution, for example Fe which may be from 0-5 g/L, and the inherent accumulation of minor impurities, such as Mg and Zn.

The reactions that occur during the pressure oxidation 12 are typified by the reaction of the most common Cu mineral, namely chalcopyrite:

$$CuFeS_2+5/4O_2+H_2SO_4 \rightarrow CuSO_4+1/2Fe_2O_3+2S+H_2O \quad (1)$$

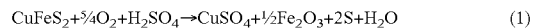

In reaction (1) the Cu in the sulphide mineral is oxidized and is converted to copper sulphate, an aqueous soluble species, i.e. Cu goes into solution, which occurs in acid conditions (i.e. pH below 2.0), at the typical operating pressure and temperature of approximately 150° C. However, if the discharge pH is above 2.0, the copper sulphate begins to hydrolyze to solid basic copper sulphate ($CuSO_4.2Cu(OH)_2$) in the autoclave and the copper will stay in the solid phase rather than leaching into the aqueous phase:

$$CuSO_4+4/3H_2O \rightarrow 1/3[CuSO_4.2Cu(OH)_2]+2/3H_2SO_4 \quad (2)$$

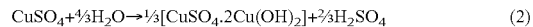

Thus the overall reaction during the pressure oxidation 12 (if all of the copper sulphate in solution hydrolyzes) is a combination of reactions (1) and (2):

$$CuFeS_2+5/4O_2+1/3H_2O+1/3H_2SO_4 \rightarrow 1/3[CuSO_4.2Cu(OH)_2]+1/2Fe_2O_3+2S \quad (3)$$

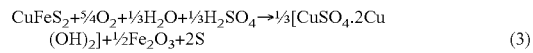

In practice, both reactions (1) and (3) may occur, (i.e. not all the copper sulphate hydrolyzes) depending on the pH of the final slurry, which in turn depends on the acid balance in the pressure oxidation 12. Reaction (1) consumes acid, and generally some acid is added in the aqueous feed solution 13, (hence its alternate term "feed acid"). However, there are also some possible side reactions occurring simultaneously which produce acid, particularly if pyrite is present in the concentrate, as commonly occurs for copper concentrates. This situation is described further below.

Similar reactions exist for other common copper minerals such as bornite, covellite and chalcocite, and the corresponding Zn, Ni and Co minerals, except that hydrolysis of these metals tends not to take place under these conditions, so the prevailing reactions are similar to reaction (1) not (3).

In the case of the Fe minerals pyrite and pyrrhotite, the reactions are typically:

$$FeS_2+15/4O_2+2H_2O \rightarrow 1/2Fe_2O_3+2H_2SO_4 \quad (4)$$

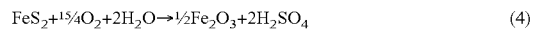

$$FeS+3/4O_2 \rightarrow 1/2Fe_2O_3+S \quad (5)$$

It is to be noted that pyrite produces acid in the reaction (4), whereas pyrrhotite does not (reaction (5)).

The acid produced by pyrite plays a major role in determining the acid balance in the pressure oxidation 12. If the acid produced by reaction (4) plus any acid added in the feed solution 13 is greater than the acid consumed in reaction (1) (and its counterparts for other base metal minerals as noted), then there will be an excess of acid and reaction (2) will be limited or non-existent. In such a case, Cu in a concentrate that is oxidized will also be leached partly or wholly into solution.

Conversely if the acid balance is such to use up all acid created or added, then reaction (2) will prevail and most of the Cu in the concentrate that is oxidized will be simultaneously hydrolyzed to solid form, namely the basic copper salt.

All of the above oxidation reactions are exothermic and the percentage solids (i.e. ratio of the two feed streams, i.e. the initial slurry 8 and aqueous feed solution 13) is generally adjusted in the process to take advantage of this feature. The combined slurry can thus reach an operating temperature in the autoclave of about 150° C. (starting from ambient temperatures of the feed streams of 15° C.-40° C.) without recourse to external heat addition or removal (cooling).

In this sense the process may be said to run autogenously, which avoids the cost of heating or cooling the feed or product streams. This is a distinct advantage in dealing with slurry streams which usually have scaling problems in heat exchangers.

Sometimes, however, insufficient heat is generated for the desired percentage solids for autogenous operation, so some heat may be added to the aqueous feed solution 13. This situation occurs when secondary minerals such as chalcocite are present, and less exothermicity is realized compared to chalcopyrite, for instance.

Conversely, when pyrite is present in large amounts in the concentrate, correspondingly large amounts of heat are generated. In this case the feed solution 13 must be kept as cool as possible, even by use of cooling towers to remove heat, and also the percentage solids is reduced as far as possible to prevent the operating temperature of the pressure oxidation 12 rising above the target temperature.

It is undesirable to operate the pressure oxidation 12 above 160° C. as liquid elemental sulphur (which is a product of the reaction in the autoclave), undergoes a phase transformation from a fluid state to a viscous state. This high viscosity is detrimental to the process and thus 155° C. is chosen as a practical limit although small excursions in the range of 155° C. to 160° C. are permissible. It is known that elemental sulphur also oxidizes rapidly under these conditions to sulphuric acid above 160° C., which is undesirable, creating excess heat and acid, using up oxygen.

It has been found beneficial in some circumstances to add a surfactant to the feed slurry 8 to modify the nature of the elemental sulphur inside the autoclave, and as discharged from the autoclave, i.e. to render the sulphur particles more finely divided. The surfactant reduces the surface tension of the liquid sulphur phase at the operating temperature, leading to small droplets rather than large liquid globules in the autoclave, and corresponding small solid particles in the product slurry after solidification.

This feature helps gold extraction in some cases, and can be accomplished by adding a surfactant, such as lignosol or related derivates such as calcium lignosulphonate. Other surfactants such as quebracho are known to perform a similar function in the related process of zinc pressure leaching and likely would be effective here also.

The product slurry 9 in the autoclave is discharged in two steps, (which may be combined), namely:

(a) discharge from the autoclave, either batch-wise or continuously; and (b) cooling and depressurization, to allow for further processing, such as filtration, etc.

In batch-wise discharge mode, the two steps are typically separated, generally (b) and then (a) for practical reasons.

In the present example, the slurry 9 is discharged in continuous mode, from high temperature and pressure to atmospheric pressure and a reduced temperature of about 95° C.-102° C., (depending on both site elevation, i.e. ambient pressure and solution composition). Thus the two steps are essentially combined.

The discharge of the hot pressurized slurry 9 from the autoclave is done very quickly so that there is a substantially instantaneous release of pressure. This form of slurry discharge is known as "flashing", whereby the slurry is cooled almost instantly by the release of overpressure, i.e. releasing steam and oxygen, indicated by arrow 10 in FIG. 1. The release is controlled by a choke and takes place in a fraction of a second, e.g. milliseconds. The choke matches the discharge with the feed volume to the autoclave so that there is no change in volume.

It is not known exactly why the flashing is so beneficial, but the reasoning is as follows:

a) The temperature of the slurry during pressure oxidation 12, i.e. before discharge, is above the melting point of elemental sulphur, which is about 115° C.;

b) By flashing the hot slurry from, say 150° C. to 100° C., elemental sulphur that is present in the hot slurry in liquid form, is transformed rapidly to the solid form, once the temperature drops substantially below the melting point; and c) By achieving a rapid drop in temperature and thus forcing the liquid-solid transformation to be extremely rapid, the solid particles of sulphur that are produced are exceedingly fine.

Surprisingly it has been found that this method has the benefit of allowing much higher extraction of precious metals subsequently from the leach residue (after base metal extraction).

This flash depressurization is indicated at 14 in FIG. 1.

Typically the discharge slurry 9 from the pressure oxidation 12 is only mildly acidic, pH 2-3, wherein most of the copper minerals in the feed concentrate are converted to the solid basic copper sulphate, rather than being leached into solution. Therefore, in this pH range, aqueous copper sulphate hydrolyzes from solution to form a solid, at least in part. The solid is then treated for copper recovery in a subsequent acid leaching step, typically at atmospheric pressure.

However, as indicated above, there is a variation of the process, e.g. for copper concentrates that are high in pyrite.

With such copper concentrates the oxidation of sulphur to sulphate (sulphur oxidation) during pressure oxidation 12 is frequently much higher than average, e.g. 10-30%. In these cases, the process flowsheet has to be modified to accommodate the excess acid produced, which lowers the pH of the slurry 9 to pH<2, which prevents hydrolysis of the copper ions as the basic copper salt. In this case, no basic copper salt is formed and essentially all Cu is leached into solution during the pressure oxidation 12, thus eliminating the need for the subsequent acid leach.

In order to achieve the best results in such cases where the acid leach is eliminated, the pH is deliberately kept even lower at say pH 1.0-1.5 (corresponding to about 10-20 g/L free acid), in the pressure oxidation discharge. Since the chloride concentration in the pressure oxidation 12 is already high at about 12 g/L Cl, and the temperature is in a high range, the combined effect is to simulate or even improve on the conditions of the subsequent acid leach, had it taken place, so far as to remove cyanide-soluble copper from the residue.

The slurry 9 that is discharged from the pressure vessel by flashing 14, usually in the range of about 10-30% solids, is subjected to liquid-solid separation, as shown at 18. Typically this is done in two stages by first thickening the slurry to about 40-60% solids, and then the underflow from the thickener is filtered, either by known vacuum or pressure methods.

If necessary, washing may be done at the filtration stage to remove entrained leach liquor from the filter cake, especially in the case of concentrates that are high in pyrite, where there is no second acid leaching operation.

To facilitate filtering of the hot slurry, which is about 95° C.-102° C. after flashing 14, part of the overflow from the thickener is best cooled by known methods, (such as a cooling tower), and this cooled stream returned to the thickener to reduce the operating temperature of the thickener to about 65° C. or lower, suitable for filtering with most filters.

The rest of the thickener overflow (indicated as 19 in FIG. 1) is then sent to copper solvent extraction, as shown at 20.

The filtrate from the filter is usually sent back to the thickener for further clarification, and the filter cake sent to the subsequent acid leach, if necessary, before being treated for gold and silver recovery.

In the subsequent acid leach, the solid residue from the pressure oxidation 12 is leached in a hot dilute acid solution containing chloride, so as to minimize cyanide-soluble copper content. This is referred to as "enhanced acid leaching", denoted as "EAL", (indicated by reference numeral 16 in FIG. 1) to distinguish from the subsequent acid leaching step (atmospheric leach), denoted as "AL", of the process of the '708 patent. The conditions of the enhanced acid leach 16 are found to benefit subsequent precious metal leaching (with cyanide solutions), where copper is a major consumer of cyanide.

The main reaction in the enhanced acid leach 16 is the dissolution of basic copper sulphate by sulphuric acid:

$$[CuSO_4.2Cu(OH)_2]+2H_2SO_4 \rightarrow 3CuSO_4+4H_2O \quad (6)$$

The sulphuric acid can conveniently be supplied by raffinate from solvent extraction, to be described later.

The conditions are similar to the atmospheric leach step described in the '708 patent, but are more severe, with one or more enhancements such as:

(i) higher temperature: 50° C.-95° C., preferably 75° C., instead of ambient or 20° C.-40° C.;

(ii) longer retention time: 2-4 hours, preferably 3 hours, instead of 60 minutes;

(iii) higher chloride concentration in the leach solution: 2-10 g/L, preferably 4 g/L, instead of 0.1-1.0 g/L; and (iv) lower pH or higher acidity: pH 1.0-1.5, preferably 1.3, instead of pH 1.6-2.0.

Not all of these enhancements need to be implemented at the same time, but the benefits appear to flow from a combination of these enhancements.

Reaction (6) does not quite go to completion in the "normal" atmospheric leaching described in the '708 patent and referred to above as the "subsequent acid leaching". Typically 3-7% of the Cu content is left in the residue, which is apparently mostly due to unreacted basic copper, sulphate, perhaps mixed with or absorbed on hematite. Unfortunately some of this "unleached" Cu left over after atmospheric leaching (AL) is cyanide soluble, i.e. forms soluble copper cyanides in the subsequent stages of the process.

However, we have discovered that this cyanide soluble Cu can be substantially reduced by the enhanced leaching 16 (EAL), described above.

The enhanced leaching 16 is typically is carried out in a reactor train of 3-4 stirred tanks, with gravity overflow connecting the tanks in series. The tanks are agitated moderately, to provide adequate mixing of liquid and solids. Coagulant is usually added into the last (4$^{th}$) reactor to help coagulate fine solids, which aids in the flocculation used in the subsequent thickening operation.

Filtration of the leach solids resulting from the enhanced leaching 16 is hindered by the presence of these fine solids, but fortunately they thicken quite well, provided adequate coagulation and flocculation is used, producing underflow streams of 45-55% solids in reasonable settling times.

The resultant slurry from the leaching 16 is therefore pumped to a series of 3-6 thickeners for counter-current washing, (CCD circuit) with wash water added into the last thickener and slurry fed to the first thickener. CCD circuits are a well established technology in which thickener overflow from each thickener moves in an opposite direction to the thickener underflow, thus ensuring most efficient use of wash water.

Wash water (stream 138 in FIG. 1) used in this CCD circuit is partly derived from downstream in the process as shown in FIG. 1. The stream 138 is a neutralized raffinate from a subsequent neutralization step 35 (see below) with only dilute amounts of dissolved copper and acid, making it suitable for washing purposes.

Additional wash water may be added in the form of fresh water depending on the water balance of the whole CCD-EAL circuit. The fresh water helps to remove minor amounts of entrained copper bearing liquor in the CCD circuit.

It is an advantage of this process that most wash water is generated internally, thus allowing the entire process to run with a positive water balance, that is to say, water is added overall, as opposed to having a surplus liquid effluent to be disposed of, which could create environmental issues. In principle the overall process operates without any such liquid effluent and is therefore considered as a "closed" loop.

The leached residue from the enhanced leaching 16 is thus separated from the leach solution by thickening with washing, to remove entrained liquor to the maximum practical extent.

The final thickener underflow is then generally filtered as part of operation 17 to produce a filter cake 31, which is ready for the extraction of precious metals.

The liquor product of the CCD circuit is the overflow from the first thickener, which is the pregnant leach liquor 22 which is subjected to solvent extraction 26.

The principal benefit of the enhanced acid leach (EAL) 16 compared to the acid leach (AL) of the '708 patent is the reduction in cyanide-soluble copper content of the resulting residue, which in turn results in:

a) Improved copper recovery for the overall process, about 1% extra recovery, e.g. from 96% to 97% overall; and b) Reduced cyanide consumption for the cyanide leach due to reduced Cu cyanide formation. This is the major effect as it can reduce Cu cyanide formation by more than three times in some cases.

It is to be noted that a side effect of the enhanced acid leach 16, compared to the "normal" atmospheric leaching (AL), is increased Fe leaching at the same time as the Cu is leached. The reaction is believed to be:

$$Fe_2O_3+3H_2SO_4 \rightarrow Fe_2(SO_4)_3+3H_2O \quad (7)$$

Typically the "normal" atmospheric leach liquor has 0.5-1.0 g/L Fe in solution along with Cu, but in the enhanced leach 16, the Fe content is higher at about 3-5 g/L. This is not a serious disadvantage though, as the Fe concentration reaches equilibrium with the recycle of raffinate from solvent extraction, and the net Fe leaching is still very low, typically around 1% of the Fe in residue. It may even be an advantage to have the higher Fe concentration because the raffinate is generally recycled to the pressure oxidation 12, in part, as the Fe sulphate provides additional sulphate for the pressure oxidation 12, (where it hydrolyzes to $Fe_2O_3$ in situ, and generates acid in the autoclave), and thus reduces acid requirements and hence evaporation requirements.

The pregnant leach liquor (PLS), which may be one or two separate streams 19 and 22 produced by the pressure oxidation 12 and the enhanced acid leach 16, respectively, are then treated for copper recovery by solvent extraction, as shown at 20 and 26 respectively.

It will be noted that the leach liquor stream 19 from the pressure oxidation 12 is the same as the thickener overflow stream 19 referred to earlier. Also when the acid leach 16 is omitted, the stream 22 will not be present and the solvent extraction 26 does not occur.

The aqueous streams 19, 22 typically have 30-50 g/L Cu and about 10-15 g/L free acid, as $H_2SO_4$.

The Cu solvent extraction process is known in the industry. Although the process is described as solvent extraction, actually there are two distinguishable parts, extraction and stripping, as will be described.

During Cu solvent extraction 20, 26, the leach liquor(s) 19, 22 are contacted with an organic extractant, such as LIX™ 973, (from Cognis corporation), in a suitable ratio of organic to aqueous phases, typically 3:1. Each solvent extraction 20, 26 takes place in a series of mixer-settlers or other similar equipment, with auxiliary equipment, such as pumps, agitators and storage tanks, as required.

The solvent extractions 20, 26 operate best at about 35° C. to 40° C. and atmospheric pressure. The temperature is generally maintained by the sensible heat of the input streams, i.e. the hot leach liquor(s) 19, 22. If the temperature is excessive, heat exchangers or cooling towers may be used to control the temperature to about 40° C. Conversely, heat may be supplied by heat exchangers if needed, in cold climates.

The organic extractant is diluted with a kerosene phase for optimum performance, typically to produce 40% by volume of extractant.

The organic stream 23 fed to the extractions 20, 26 originates in the stripping part of the process, described below and is also referred to as "stripped organic" (SO). Typically it has 7-8 g/L Cu in solution, depending on composition, i.e. percentage extractant in the diluent, and other factors.

The mixture of aqueous and organic phases in the mixer-settlers used in the extractions 20, 26 is agitated for about 2-6 minutes, then passed into a quiescent zone of the mixer-settler to allow maximum separation of the phases (by gravity), and separated. This process generally is repeated in another mixer-settler operated in counter-current mode to the first, i.e. with the organic stream flowing counter-current to the aqueous stream.

This allows maximum loading of the organic stream while still extracting maximum copper from the aqueous stream.

Alternative mixing and settling arrangements are possible, e.g. pulsed columns of various designs.

As shown, the loaded organic extractants 24 and 25 from the solvent extractions 20 and 26 are combined to form a combined stream, the loaded organic (LO) 27, which usually contains 17-20 g/L Cu, if a 40 vol % extractant is used. The depleted aqueous streams, "raffinate", streams 40 and 41, respectively, of each of the solvent extractions 20 and 26, typically contain 10-15 g/L Cu and 40-65 g/L free acid ($H_2SO_4$), and are recycled for further leaching after possible neutralization, as will be described.

The loaded organic (LO) 27 is then stripped of its Cu content, as indicated at 28, by contacting with a strong acid stream 29 (also referred to as "stripped electrolyte" (SE)) which is recycled from the electrowinning stage 30 and which converts the loaded organic (LO) 27 to the stripped organic (SO) 23. The stripped organic (SO) is then recycled to the extractions 20, 26 completing the circuit, as indicated by the stream 23 in FIG. 1.

The stripped electrolyte 29 is enriched in Cu by the stripping process 28, and is thereby converted to pregnant electrolyte (PE) 32, which is sent to electrowinning 30 for Cu recovery.

The raffinate 41 produced by the solvent extraction circuit 26 is acidic. Part of it is needed for either the pressure oxidation 12 or for the enhanced acid leach 16 or both, as described above. However, there is generally an excess of raffinate 41 which is neutralized as described below.

The raffinate 41 is split, as shown at 44, into three streams 46, 47 and 48. The raffinate split 44 is determined by the needs of the pressure oxidation 12 and the leaching 16, with the reminder being neutralized, as indicated at 35.

The pregnant electrolyte 32 (PE) contains about 45-50 g/L Cu and about 150-160 g/L free acid (as $H_2SO_4$), and is subjected to the electrowinning 30 to reduce the Cu concentration by about 10-12 g/L Cu and produce copper metal in the form of high purity cathodes. The electrowinning 30 is usually carried out in continuous mode, with the cathodes being stripped every 5-8 days.

During the electrowinning process 30, the pregnant electrolyte 32 is converted back to stripped electrolyte 29 with depleted Cu content but higher acidity. The composition of the stripped electrolyte 29 is approximately 35-40 g/L Cu and about 170-180 g/L free acid, which is then used for more stripping in the solvent extraction circuit. This completes the cycle for the stripped electrolyte—pregnant electrolyte.

During the pressure oxidation 12 a small amount of the sulphur in the concentrate is oxidized to sulphate, which must be removed to prevent accumulation. Most of this sulphur oxidation is due to the pyrite reaction (4) above.

The sulphate is removed by partly neutralizing one or both of the two raffinate streams 40 and 41 from the solvent extractions 20 and 26, as shown at 33 and 35 in FIG. 1. In practice only a fraction of the raffinate 41 is neutralized as not all of the acid should be neutralized, the rest is needed for the leaching 16 and/or acid feed to the pressure oxidation 12, as shown in reaction (1), for example.

Neutralization 33, 35 is respectively effected on the raffinate 40 from the solvent extraction 20 and on the selected fraction (the stream 47 after the split 44) of raffinate 41 using limestone, $CaCO_3$, to react with the free acid in the aqueous streams. This process is carried out in a series of agitated tanks connected in series with gravity overflow, much like the enhanced acid leach 16 process. The process forms gypsum, $CaSO_4.2H_2O$ as a solid byproduct, which is filtered and washed as shown at 36 and 37. The gypsum filter cakes from both filtration steps 36 and 37 are combined for disposal. The filtrate or neutralized stream from the filter step 36 is then mixed with the rest of the acidic raffinate (stream 46), as indicated at 38, and the product is the feed stream 13 used for pressure oxidation 12, completing the circuit. Filtrate from the neutralization 35 is used as a wash 138 in the CCD circuit (liquid-solid separation 17) after the enhanced acid leach 16. The stream 48 is recycled for use in the leaching 16.

Figure 2:
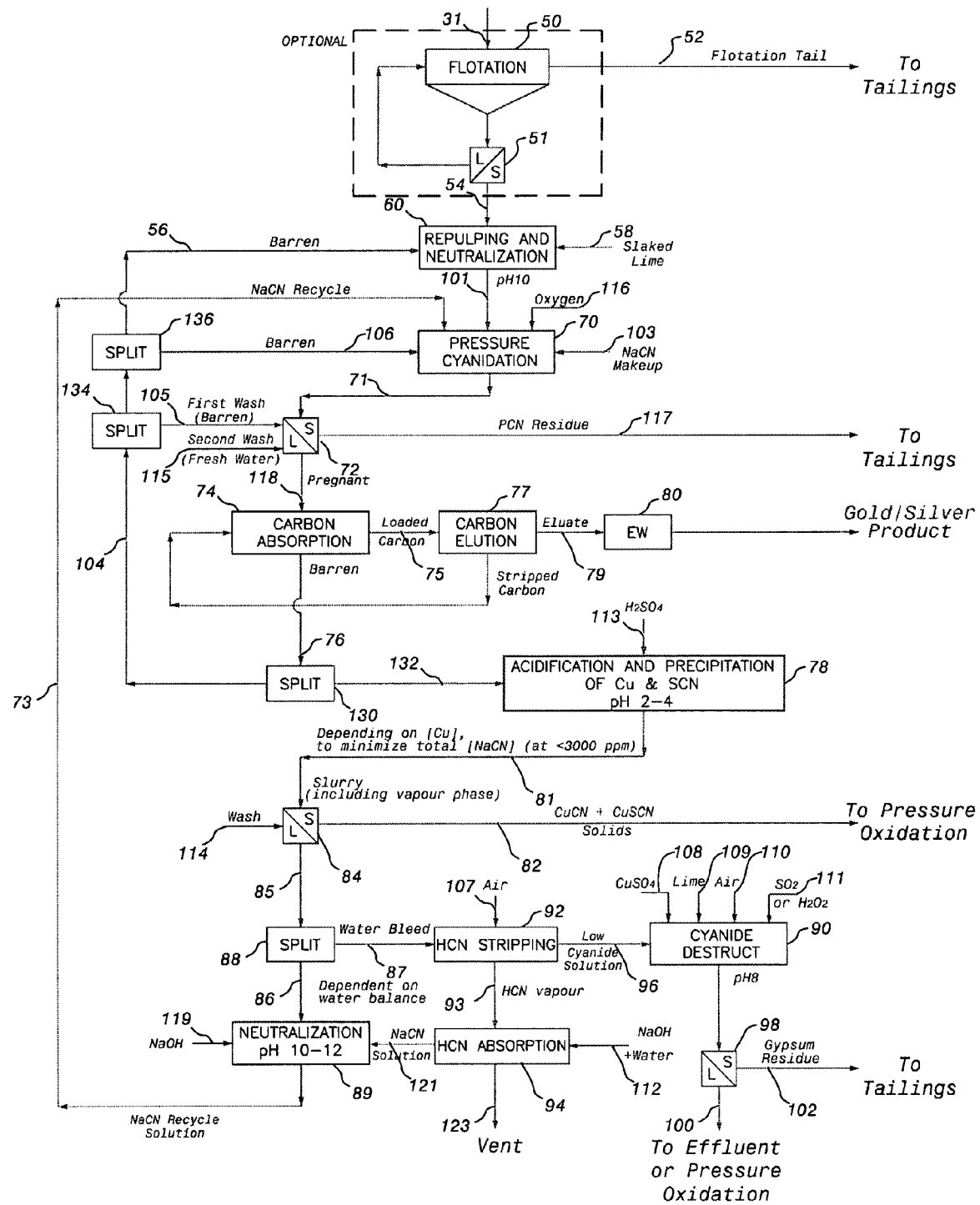
FIG. 2 is a flowsheet of a second part of the process showing the recovery of gold and silver.

The residue 31 from the enhanced acid leaching step 16 (after liquid-solid separation 17), may be subjected to flotation, as shown at 50 in FIG. 2, depending on gold and silver content. In the process variation where the leaching step 16 is omitted, the residue 31 will of course be coming from the pressure oxidation 12 and the liquid-solid separation 18.

After the liquid-solid separations 17, 18, the solid is subjected to thorough washing to remove entrained solution as far as practically possible, as this benefits the extraction of precious metals by reducing the input of soluble Cu compounds in particular.

The purpose of flotation 50 is to reject a tailings stream 52 with minimal values in precious metals, typically <0.5 g/t gold, or silver equivalent, and yet still recover more than 90% of precious metals from the residue 31 from the leach 16 into a flotation concentrate 54. The flotation 50 aims mainly to reject the iron oxides and the gangue into the tailings 52.

The main constituents that are recovered into the concentrate 54 are elemental sulphur, unreacted sulphides, and most importantly, the precious metals.

Flotation 50 is an optional step, not necessary in all cases, but useful for concentrates with particularly low grades of gold and silver, where the low grades may not be sufficient to render gold-silver recovery economic.

Conversely, flotation 50 is not useful for high grade materials as the losses to the tailings 52 would likely constitute an economic penalty. Although the flotation process 50 is efficient, it is never 100% effective and some minor losses (1-10%) of precious metals to the tailings stream 52 are inevitable.

However, by rejecting the tailings 52, the flotation concentrate 54 so produced has a lower mass, with enhanced concentration of precious metals and, therefore, lower costs in the subsequent gold-silver recovery.

The mass loss depends on the proportion of elemental sulphur and unreacted sulphides in the feed material, but generally about 30-65% mass loss can be achieved with a corresponding increase of 1.5 to 2.5 times in the precious metal content, (as g/t).

Rejecting the tailing 52 tends to decrease costs in the subsequent cyanidation step. This is particularly useful where the gold and silver values are low, and may be insufficient to support the costs of the process, unless some upgrade can be achieved.

The process of flotation 50 follows well established principles for flotation. Since the elemental sulphur is the main constituent to be floated, and it is easily floated mineral, flotation requires minimal reagents, only a small dose (20-100 g/t) of frother, such as Aeroflot™ (Cytec Corp.), and about 50-100 g/t of collector such as Aero™ 5688 (Cytec Corp.). Precious metal recovery may be enhanced by special gold-silver collectors, such as Galactosol™ (Cognis Corp.)

Flotation 50 is generally carried out at the natural pH of the residue 31, after slurrying up in water, i.e. about pH 1.5-2.5. The flotation circuit typically has just six rougher cells, with no cleaners or scavengers, and has a total retention time of about 30-120 minutes.

After flotation 50 the concentrate (slurry) is filtered 51 (see FIG. 2) to produce the concentrate (filter cake) 54.

Depending on sulphur content of the residue 31, the concentrate 54 so produced generally has a mass recovery of about 35%-70% of the residue 31. This high mass pull ensures minimum losses of precious metals into the tailings 52.

Typically gold and silver recovery into the concentrate 54 is in excess of 90% and the S recovery is even higher. Final elemental S grade in the concentrate 54 is generally between 35% and 75%. The concentrate 54 is subsequently treated for precious metal recovery and the tailings 52 are discarded to the tailings pond, along with final residue.

The flotation concentrate (filter cake) 54 is slurried as indicated at 60 where it is mixed with recycled barren cyanide solution 56 to form high density slurry, suitable for pumping into a pressure vessel. Typically the finished slurry is about 600 g/L solids. The recycled barren solution 56 is used instead of water because this minimizes water addition to the cyanidation circuit, and thus minimizes bleed requirements for water balance.

Simultaneously slaked lime 58 is added to neutralize any remaining acid components in the concentrate 54 and increase the pH to about pH 10-11, in preparation for cyanidation.

About 25-50 kg lime is needed per tonne of residue 54, which is indicative that some solid component(s) of the residue 54 is (are) reacting with the lime 58 during this process, as the amount is too high to be accounted for by the slight amount of entrained acid present in the residue 54. It is believed that there is some jarosite-type phase present in the residue 54, along with the hematite, which would account for the relatively high lime consumption, as jarosite is known to react with lime in this way, and convert to simple Fe oxides, liberating acid sulphates in the process.

The next step in the process is pressure cyanidation 70 where the repulped and neutralized residue 101 from the acid leach 16, or from the pressure oxidation 12 if there is no acid leach 16, with or without flotation upgrade, is leached with recycled (sodium) cyanide solution 73, under high pressure oxygen 116, at about 1000-10,000 kPag (145-1450 psig).

Unlike the process of the '474 patent, a sulphur removal step (for elemental sulphur) prior to cyanidation is not required, thus greatly simplifying the process and reducing costs. This simplification is partly achieved by the short duration cyanidation, which minimizes time for thiocyanate formation to occur, and also by the process of flashing which minimizes the encapsulation of precious metals in solid (elemental) sulphur particles after pressure oxidation.

In general, the recycled solution provides the majority of the cyanide reagent needed for the pressure cyanidation but the inevitable cyanide losses elsewhere in the circuit are compensated for by the addition of a small quantity of make-up NaCN (103) in a concentrated solution, e.g. 25-200 g/L [NaCN].

This process may be carried out in a gently agitated pressure reactor, (autoclave), similar to that used for pressure oxidation 12, but operating with less agitation and at ambient temperature, i.e. about 5° C.-35° C., although higher temperatures may also be used. The process can be carried out in batch or continuous mode, but most likely the latter is more useful for commercial applications.

Alternatively, a pipeline reactor may be used, with a long length and a relatively small diameter, so as to achieve turbulent conditions, (with a very high Reynolds number), to induce adequate phase mixing (gases, liquids and solids), as is known for such reactors.

The retention time is comparatively short, (compared to conventional atmospheric cyanidation), about 30-120 minutes, as surprisingly this has been found sufficient to obtain excellent precious metal recovery from the residue 54 under these conditions. In contrast, conventional (atmospheric) cyanidation processes have much longer retention times, e.g. 24-72 hours. The retention time can be varied between the above limits dependent on the dissolution rate of gold which can differ from concentrate to concentrate.

Pressure cyanidation 70 has been found to have a surprising but very important benefit. The short retention time minimizes the formation of thiocyanate (NaSCN) during cyanidation, even with the high pressures of oxygen so employed. Thiocyanate production can thus be drastically reduced, compared to atmospheric cyanidation using the typical long retention times mentioned above. Reductions in thiocyanate production with this invention can be as much as ten times or more, compared to conventional atmospheric cyanidation with long retention times.

(Note that throughout this description, the sodium content of most compounds is omitted for brevity, thus sodium thiocyanate (NaSCN) is generally referred to as simply "thiocyanate". Sodium cyanide is the usual cyanide leaching agent, although other compounds such as calcium cyanide can be used. The copper cyanide compound ($Na_3Cu(CN)_4$) is generally referred to as copper cyanide, etc.).

The major byproducts of cyanidation 70 of the concentrate 54 (besides dissolved precious metals), are copper cyanides, (typically Na$_3$Cu(CN)$_4$, although there are others), thiocyanate (NaSCN) and cyanate (NaCNO). These are the species which cause high cyanide consumption, and the minimization of such costly byproducts is therefore an important objective of this invention.

Excess thiocyanate formation in particular can be fatal to the economics of the process, as this form of cyanide loss is generally unrecoverable by known methods.

The concentration of cyanide in solution is very important to this invention, in particular the active cyanide and the total cyanide concentrations.

In order to achieve satisfactory gold and silver leaching during the process of pressure cyanidation on copper residues, it has found necessary to maintain high levels of active cyanide, (a term described under Definitions of Terms below). Approximately 1000 ppm or mg/L NaCN as active cyanide are needed to achieve high gold and silver recovery, although this may be varied from about 500 to 2000 ppm NaCN active cyanide.

It has also been found necessary to limit the total cyanide, as defined under Definition of Terms, to about 3000-4000 ppm NaCN, in order to minimize cyanide losses as HCN vapor, entrained cyanide solution in the final residue, and also to minimize thiocyanate production during the pressure cyanidation. In practice, the total cyanide concentration can be varied from about 1000 to 10,000 ppm NaCN, but the 3000-4000 ppm range has been found to be optimum. This provides the optimum compromise between cyanide losses, minimum size of process plant, and satisfactory recovery of gold and silver.

The resultant slurry 71 from pressure cyanidation 70, which for example is continuously discharged from the pressure vessel and temporarily stored in a holding tank, is filtered as indicated at 72, and for optimum gold and silver recovery is washed first with barren solution 105, and then subsequently with fresh water 115 for optimum cyanide solution recovery. The resulting residue cake (117), for example containing less than about 0.2 ppm gold is disposed to tailing. The combined filtrates 118 (pregnant solution) are then treated first for precious metal recovery as indicated at 74, either by the known process of carbon absorption or some other absorbent such as a proprietary resin developed for this purpose, and then the resultant barren solution 76 is treated for cyanide recovery before recycling back to the pressure cyanidation vessel (as indicated by stream 73).

The loaded carbon or resin 75 from the carbon absorption 74 is treated by one of several commercially practiced processes to recover the precious metals. Typically this involves elution 77 of the carbon or resin followed by electrowinning 80 of the eluate 79 to obtain gold/silver product.

The barren solution 76 from the carbon absorption 74 is split, as indicated at 130, into streams 104 and 132. It is the stream 132 that is subjected to the cyanide recovery process.

The remaining stream 104 which is not subjected to the cyanide recovery process is recycled and split at 134 and 136 to provide the streams 105, 106 and 56 which are respectively used for the first wash referred to above, and for pressure cyanidation 70, and the repulping and neutralization step 60.

The cyanide recovery process is quite complex, and has a number of variations. Essentially though, the barren solution 76 has to be treated to remove the three byproducts listed above, namely Cu, thiocyanate and cyanate, or they will build up indefinitely in the recycling solution 104.

Copper cyanides are treated primarily by an improved modification of the well-known AVR (Acid-Volatilization-Reneutralization) process, in which most of the attached cyanide in the copper cyanide complex is recovered as active cyanide (NaCN), and recycled back for more gold and silver leaching (stream 73). Thus cyanide converted to copper cyanides is not a net cyanide loss, but it does represent a cost in the recycling process. The copper in the cyanide complex is precipitated as either solid CuCN, solid Cu$_2$S (with a sulphide precipitation agent such as NaSH), see below, or preferably as solid CuSCN. In most cases, such Cu can be recovered from such precipitates by subsequent processing, for instance by recycling (stream 82) to the pressure oxidation 12, and therefore does not represent a loss in Cu recovery.

Generally it has been found beneficial to use CuSCN precipitation for Cu removal, as this simultaneously removes thiocyanate ions from the recirculating cyanide solution. This process takes place during the acidification and precipitation process 78 when the barren solution 132 is acidified with H$_2$SO$_4$ (113) to lower the pH from alkaline (pH 10-11) to the acidic region (pH 2-4). In acid solution, the copper cyanide complexes are unstable forming HCN and Cu$^+$ and Na$^+$ ions, thus allowing the Cu$^+$ ions to react with the SCN$^-$ ions and form insoluble CuSCN. The overall reaction is:

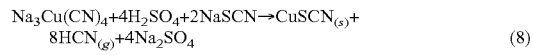

$$Na_3Cu(CN)_4 + 4H_2SO_4 + 2NaSCN \rightarrow CuSCN_{(s)} + 8HCN_{(g)} + 4Na_2SO_4 \qquad (8)$$

However, the extent of reaction (8) for simultaneous removal of Cu and SCN from solution is naturally limited by the component which is present in lesser amount. Depending on the feed material to pressure cyanidation 70, and the conditions in pressure cyanidation 70, there may be formed either excess Cu or excess SCN. For instance, longer retention times in pressure cyanidation 70 lead to high SCN production, and inadequate leaching in the acid leach 16 leads to high presence of Cu in the pressure cyanidation 70. Also, the production of SCN in the pressure cyanidation 70 seems to vary from one feed material to another for reasons that are not fully understood as yet.

Excess amounts of Cu (over and above the requirements for reaction (8)) can be removed either by acidification to precipitate solid CuCN as in the following reaction:

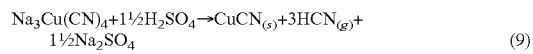

$$Na_3Cu(CN)_4 + 1\tfrac{1}{2}H_2SO_4 \rightarrow CuCN_{(s)} + 3HCN_{(g)} + 1\tfrac{1}{2}Na_2SO_4 \qquad (9)$$

Or by sulphidizing with a reagent such as NaSH to precipitate solid Cu$_2$S, as in the reaction below:

$$2Na_3Cu(CN)_4 + NaSH \rightarrow Cu_2S_{(s)} + HCN_{(g)} + 7NaCN \qquad (10)$$

Excess SCN can only be removed by bleeding barren solution through the cyanide destruction circuit 90, see below.

The third byproduct mentioned above is cyanate, or NaCNO. Small amounts of this compound are formed during the cyanidation 70 and are believed to be related to the reduction of cupric ions (Cu$^{2+}$) to cuprous ions (Cu$^+$) during cyanidation of copper. Surprisingly, the amount of CNO formed is quite small, and less than would be expected from the Cu cyanidation but is significant nevertheless. Cyanate tends to accumulate in the cyanide solution upon recycle, and must eventually be removed in some manner.

The CNO and any residual SCN ions can be bled out of the circuit into the tailings pond once the solution has been treated for cyanide destruction 90, as these species to our knowledge are not considered toxic.

The acidification process 78 for cyanide recovery is carried out in closed reactors to contain all HCN vapors, with continuous addition of sulphuric acid 113 to about pH 2-4. A single pipe reactor is suitable with a retention time of about 15-45 minutes at ambient temperature. No mechanical stirrer is required as a static mixer is sufficient.

The acidified slurry 81 is filtered by an enclosed filter, as indicated at 84, to remove the CuSCN solids 82 and other solids precipitated, such as CuCN, leaving both gaseous and aqueous phases together in the filtrate 85 which is low in copper. The filter cake may be washed with fresh water 114, and recycled to the pressure oxidation 12 for Cu recovery.

The filtrate/gas mixture 85 is split 88 into two streams 86 and 87, as indicated at 88. One stream 86 goes to neutralization 89 and the other stream 87 goes to HCN stripping 92 and absorption 94 for removing most of the cyanide prior to the cyanide destruct stage 90.

The split 88 is determined partly by the need for water balance (the stream sent to stripping 92 is eventually discarded), and partly by the need to limit the overall cyanide tenor in the recycled barren stream 73 (to limit HCN vapor losses throughout the circuit). An upper limit of about 3000 ppm total NaCN is found to be suitable for minimizing such volatile losses.

The cyanide tenor is largely determined in turn by the Cu concentration which complexes the cyanide. When Cu leaching is low, cyanide tenors are also low, and if low enough, all of the acidified product can go to the stripper 92.

Conversely when the Cu leaching is high, more acidification product has to be routed through neutralization 89 rather than stripping 92, as this route allows more Cu to be precipitated in the next cycle through to acidification.

The purpose of neutralization 89 is to increase the pH back up to the level used for pressure cyanidation 70, i.e. pH 10-11, and allow this stream to be recycled as barren liquor (stream 73).

Caustic 119 is used as the reagent for the neutralization 89. About 2-4 kg NaOH is needed per tonne of residue feed to the plant. Some additional NaOH is supplied by the product stream 121 from HCN absorption 94.

Conditions during neutralization 89 are typically 5-60 minute retention, at ambient temperature, in a closed reactor, to prevent HCN vapor loss. A mechanically stirred reactor or a static mixer is suitable, using continuous additions and discharge.

The HCN gas is converted back to NaCN during this operation, using NaOH added (119) or the $Na_2SO_4$ already in solution, as the source of Na.

During stripping 92, the filtrate stream (acidification product) 87 is stripped of its HCN gas phase by air stream contact in a packed tower, conveniently carried out in a continuous mode of operation to produce an HCN vapor 93 and a solution 96 low cyanide. At the pH used pH 2-4, HCN is easily stripped and virtually quantitative HCN recovery is observed.

Ambient temperatures are suitable and an air stream 107 of about 1.0 liters air per $m^2$ packing per minute has been suitable, although this may be varied considerably.

The gas product 93 now containing HCN is then absorbed 94 in a caustic solution 112 in a continuous fashion, using known absorption practice. A bubble tray or a packed column has been found suitable.

Conditions in the absorber 94 are pH 11-12 with NaOH 112 added in concentrated form to maintain this pH. Consumption of NaOH is typically 2-4 kg/tonne residue.

In the absorber 94 the HCN is converted to NaCN to produce a NaCN solution 121 which then goes to the neutralization reactor 89, to form a combined stream with the other filtrate stream 86 which is recycled as barren liquor 73 to the pressure cyanidation 70. The scrubbed gas 123 is vented to atmosphere.

Cyanide destruction 90 is used to treat the low cyanide solution 96 from the stripper 92, in order to maintain a water balance throughout, and bleed out some impurities that would otherwise build up indefinitely.

More particularly, the low cyanide solution 96 is processed through the cyanide destruct circuit 90 using either $SO_2$ or peroxide as the oxidant 111, air 110, and copper sulphate 108 (as catalyst), according to known technology. Slaked lime 109 is used to raise and maintain the pH at 8.

Strong acid dissociable cyanide species that may be present in the solution 96 are efficiently oxidized to cyanate by the air/$SO_2$ mixture 110/111. Notably, SCN is not affected by this process and goes through virtually unchanged.

The main product species is cyanate, CNO, which is considered relatively benign to the environment and therefore can be discharged to a tailings pond.

Two reactors are typically used in a continuous mode, with pH control in the first reactor with slaked lime, to pH 7-9, and air/$SO_2$ into both. The $SO_2$ content of the air mixture is typically 1-2%, but can be varied. The copper sulphate it is added at a dosage of about 0.03 kg/t residue.

Retention time is about 4-8 hours combined in both reactors, and ambient temperatures are suitable.

The product slurry from the cyanide destruct reactors is then filtered by vacuum methods, as indicated at 98, to produce a filtrate 100 and a filter cake 102. The filtrate 100 may be recycled to the pressure oxidation 12 or discharged to an effluent or the tailings pond.

The filter cake 102 consists largely of gypsum (>95%) with trace amounts of Cu and Fe (originating as the trace amounts of Fe cyanide that also leach). It is sent to tailings.

A number of examples are now provided to demonstrate the improvements of the new process.

Table 1A shows the key assays for the different concentrates used in the examples. Table 1B outlines the mineralogy as determined by a mineralogist, reconciled with the assays.

TABLE 1A

Assays of Concentrates used for Examples

| Concentrate # | Copper | Iron | Sulphur | Gold | Silver |
|---|---|---|---|---|---|
| I | 26.4% | 29.9% | 35.4% | 8.9 g/t | 64 g/t |
| II | 28.3% | 25.8% | 28.8% | 9.1 g/t | 51 g/t |
| III | 28.5% | 29.9% | 26.4% | 12.0 g/t | 32 g/t |
| IV | 28.3% | 28.9% | 31.7% | 7.1 g/t | 15.5 g/t |

TABLE 1B

Estimated Mineralogy of Concentrates used for Examples

| Concentrate # | Chalcopyrite | Covellite | Bornite | Chalcocite | Pyrite | Magnetite |
|---|---|---|---|---|---|---|
| I | 63% | 1% | 6% | x | 21% | x |
| II | 60% | 1% | 11% | x | 12% | x |
| III | 73% | x | 4% | 0.5% | 0.5% | 10% |
| IV | 82% | x | x | x | 6% | x |

Example 1

The following example shows the results of using known technology for treating a copper-gold concentrate, i.e. pressure oxidation and leaching for copper extraction followed by cyanidation of the residue for gold and silver at atmospheric pressure (in air) using modest levels of cyanide.

a) Copper Extraction 143 g of Concentrate I, primarily composed of chalcopyrite with 20% pyrite and minor amounts of bornite, was wet ground in a laboratory rod mill to 97% passing 45 microns. The pyrite content is relatively high for a copper concentrate, which generally leads to high sulphur oxidation in a hydrometallurgical copper recovery process, such as the process described in the '708 patent. The ground solids were slurried to 130 g/L solids, using 1050 mL of a $CuSO_4$—$CuCl_2$—$H_2SO_4$ solution made up to contain 12 g/L Cl, 12 g/L Cu, and 15 g/L $H_2SO_4$. The slurry was placed in a 2 L titanium autoclave, which was then sealed and externally heated to 150° C. Once the target temperature was achieved, high purity (100%) oxygen was supplied at high pressure to the autoclave to achieve a total pressure of 1380 kPag (200 psig), at the 150° C. operating temperature. At this temperature, the slurry has a steam pressure of about 410 kPag, so the partial pressure of non-condensible gases was about 970 kPag. This was primarily oxygen, but includes minor amounts of nitrogen, trapped during sealing procedure and any $CO_2$ (that may form during the reaction period, as a result of side-reactions between feed acid and minor amounts of carbonate minerals in the sample).

Oxygen in the autoclave was consumed rapidly as soon as it was applied, due to the reaction with the sulphide minerals, such as reaction (1). However, the pressure in the vessel was maintained at about 1380 kPag by a fresh oxygen supply tank equipped with a constant pressure regulator set for this pressure. The reaction was continued in this fashion for 90 minutes, whilst maintaining the temperature at 150° C. by means of internal cooling coils supplied by cold water. During this time, the slurry was agitated vigorously to achieve fine dispersion of the oxygen within the slurry and achieve rapid reaction rates.

Oxygen uptake was determined through measurement of the weight loss of the oxygen tank supplying the autoclave, corrected for minor losses. After 90 minutes under these conditions, the resultant slurry was cooled to 80° C. over a period of several minutes using the internal cooling coils and gently releasing the pressure. The slurry was then filtered, and washed thoroughly with water, producing 118 g of a residue containing 0.96% copper, 10.0 g/t gold and 45 g/t silver, 985 mL of a primary filtrate containing 44 g/L Cu, 12 g/L Cl, 9 g/L free acid, pH of 1.39, and 2125 mL of a wash filtrate with 1.8 g/L Cu, 0.5 g/L Cl.

Due to oxidation of pyrite, the acidity of the product liquor was sufficiently high that no basic copper sulphate was formed and all oxidized copper leached. Therefore no further leaching was needed for copper extraction, which was 97% to solution.

Note that some minor gold and silver losses were encountered at this step due to mechanical reasons in this small scale test apparatus. No significant solubilization of gold or silver was detected.

b) Gold and Silver Extraction 45 g of the residue from copper leaching was repulped to 390 g/L solids in a covered glass beaker using 98 mL of fresh water at ambient temperature (20° C.) and brought to a pH of 10.6 using 2.3 g lime in slurry form (250 g/L lime slurry). 0.25 mL of a 100 g/L NaCN solution was added to the slurry to achieve an initial concentration of 0.25 g/L NaCN and begin the cyanidation process. The slurry was agitated gently for 72 hours at ambient temperature and pressure with the customary limited ingress of air. At the conclusion of the test, the slurry was filtered and washed with fresh water, producing a 47 g filter cake containing 8.2 g/t Au and 24.8 g/t Ag, 54 mL of filtrate containing 166 ppm total cyanide, 77 ppm Cu, 8 ppm SCN, 0.7 ppm Au, 8.3 ppm Ag, 28 ppm CNO, and 359 mL of wash water containing 17 ppm total NaCN, 8 ppm Cu, 2 ppm SCN, 0.08 ppm Au, 0.9 ppm Ag, and 3 ppm CNO. Gold extraction from this residue was 15%, based on both solution and residue analysis. Silver extraction was 45%.

More data and calculations for this example are shown in Tables 5A, 5B and 5C below.

c) Conclusions

The copper extraction worked well but the gold extraction did not.

Reagent consumption during the gold extraction process, at 0.5 kg NaCN/t residue, was within the typical range for gold ores, but the extraction of gold and silver was poor. Therefore it must be concluded that the process conditions used in this example (conventional cyanidation at ambient pressure of air), are not suitable for the copper residue. Much of the added cyanide was consumed by formation of copper cyanide or thiocyanate, and insufficient free cyanide was available for gold and silver extraction.

This example illustrates the fundamental difficulty facing the challenge of extracting gold and silver from the copper residue in this process.

Example 2

The following example illustrates the effect of increasing the cyanide concentration on gold and silver recovery and also on cyanide consumption. To minimize cyanide losses due to high concentrations, the NaCN was added partly at the start (10% of total) and then the remaining 90% was added slowly throughout the reaction period to make up for cyanide losses and maintain a higher cyanide level at all times.

a) Copper Extraction 143 g of Concentrate I (Table 1) was again ground and subjected to pressure oxidation in a batch process in similar conditions as described in Example 1, except for a shorter retention time of 60 minutes. The washed residue containing 10.5 g/t gold and 43 g/t silver was used for gold and silver extraction.

b) Gold and Silver Extraction 121 g of residue from the copper extraction was repulped to 400 g/L solids using fresh water, and neutralized to pH 10.6 using lime. A small volume of 100 g/l NaCN solution was added to the slurry to achieve an initial concentration of 0.5 g/L NaCN in the slurry and begin the cyanidation process. The slurry was (gently) agitated as before in a small, partly covered, beaker, at ambient temperature and pressure for 66 hours.

Metered additions of the concentrated NaCN solution at a rate of 0.8 mL per hour continued throughout the first 60 hours of the test to a total of 5 g/L NaCN added to the slurry. After 66 hours, the slurry was filtered and washed with fresh water, producing a filter cake (126 g) containing 4.2 g/t Au and 6.2 g/t Ag, a filtrate (300 mL) containing 1.47 ppm Au, 10.2 ppm Ag, 2796 ppm total cyanide, 3500 ppm SCN, 1098 ppm Cu, 169 ppm CNO, and wash water (1350 mL) containing 166 ppm total NaCN, 57 ppm Cu, 172 ppm SCN, 0.09 ppm Au, 0.6 ppm Ag, and 11 ppm CNO.

Gold extraction from this residue was 58.1%, and silver was 85.1%, based on solids assays.

More details of the results are shown in Table 10 below.

c) Conclusions

The extra cyanide added (ten times more than in Example 1) using conventional cyanidation (at ambient pressure) resulted in better gold and silver extraction, but was still unacceptably low. Also the reagent consumption was very high at 17.6 kg NaCN/t residue.

Example 3

The following example repeats the conditions of Example 2, i.e. with cyanidation under ambient pressure of air and ongoing addition of cyanide during the leach, but with increasing the cyanide concentration still further to show the effect on gold and silver recovery.

a) Copper Extraction

Concentrate I was again ground and subjected to pressure oxidation in a batch process in similar conditions as described in Example 2.

After 60 minutes pressure oxidation under these conditions, the slurry was cooled, filtered to produce a primary filtrate, and then washed thoroughly with water, producing a residue containing 1.0% copper, 10.5 g/t gold and 56 g/t silver, and secondary or a wash filtrate. Copper extraction was 97% based on the residue copper content and a mass loss of 17%.

b) Gold and Silver Extraction 75 g of residue (dry basis) from the copper extraction was repulped at ambient temperature (~20° C.) in a small glass beaker as in Examples 2 and 3, using fresh water and brought to pH 10.6 using lime. The solids density of the slurry after repulping was 150 g/L solids, which is lower than in Example 2. This density was chosen because much larger amounts of cyanide were to be added. Decreasing the solids density of slurry has the effect of diluting the cyanide in solution, thus decreasing volatilization losses.

Figure 3:
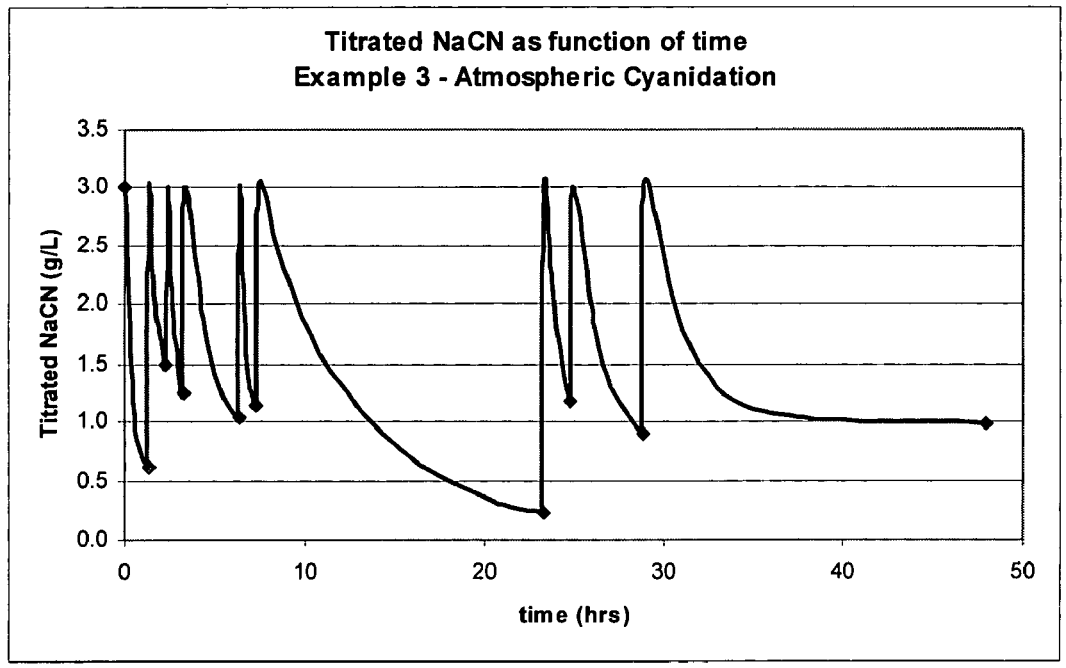
FIG. 3 is a graphical illustration showing titrated cyanide as a function of time in the cyanidation process of Example 3.

14.3 ml of 100 g/L NaCN solution was added to the slurry to start the cyanidation process, with an initial concentration of ~3000 mg/L NaCN in the solution. There were further additions of the concentrated NaCN solution at periodic intervals so as to maintain a concentration of 3000 mg/L titrated cyanide, (as determined by titration), see under Definition of Terms below. In between cyanide additions, the titrated cyanide concentration declined. The plot of titrated cyanide vs time is shown in FIG. 3.

There were five additions of NaCN solution in the first 7 hours of the cyanide leach, at 1-2 hour intervals. Each time enough cyanide was added to bring the titrated cyanide up to the 3000 mg/L level.

After 7 hours, the cyanidation was continued without further additions for another 17 hours (overnight). The next day after further titrations, three more additions were made, the last at the 28 hour mark. The slurry was agitated for a further 20 hours, (for a total of 48 hours) and then the experiment terminated. The slurry was filtered to produce a filter cake, filtrate and wash filtrates which were each analyzed as per Example 1. See Table 2 for the NaCN addition profile for the present example.

TABLE 2

| NaCN Additions for Example 3 | | | | |
|---|---|---|---|---|
| Time (hrs) | titrated NaCN (g/L) | g NaCN added | cumulative g NaCN | cumulative NaCN dosage (kg NaCN/t feed) |
| 0 | 3 | 1.4 | 1.4 | 18.7 |
| 1.3 | 0.61 | 1.1 | 2.5 | 33.3 |
| 2.3 | 1.5 | 0.73 | 3.23 | 43.1 |
| 3.3 | 1.25 | 0.86 | 4.09 | 54.5 |
| 5.3 | 1.04 | 0.98 | 5.07 | 67.6 |
| 7.3 | 1.14 | 0.95 | 6.02 | 80.3 |
| 23.3 | 0.23 | 1.43 | 7.45 | 99.3 |

TABLE 2-continued

| NaCN Additions for Example 3 | | | | |
|---|---|---|---|---|
| Time (hrs) | titrated NaCN (g/L) | g NaCN added | cumulative g NaCN | cumulative NaCN dosage (kg NaCN/t feed) |
| 24.8 | 1.18 | 0.95 | 8.4 | 112.0 |
| 28.8 | 0.89 | 1.13 | 9.53 | 127.1 |
| 48.0 | x | 0 | 9.53 | 127.1 |

A total of 9.5 g of NaCN, or 15.1 g/l NaCN, was added throughout the 48 hour retention time.

More data and results for this example are shown in Table 5A, B and C.

The final product liquor contained 5040 mg/L SCN. Gold and silver recovery in this example were 91% and 98% respectively which was an improvement from Examples 1 and 2. The total cyanide added, however, was 127 kg NaCN/tonne feed solids, much too high for an economical process. From solution assays of the product liquor, it was calculated that the loss of NaCN due to thiocyanate formation was 28 kg/t feed, due to copper was 17 kg/t feed and due to cyanate formation was 1.9 kg/t feed. The remainder was presumably due to volatilization and any un-utilized cyanide which remained in the leach solution.

c) Interpretation of Results

The data from this example are shown in FIG. 3, where the titrated cyanide level is shown as a function of time. It can be seen that for the first few hours, titrated cyanide declined precipitously from the target 3000 mg/l to 1500 mg/l or below, after a short time, i.e. within one hour, indicating rapid consumption of cyanide at this stage, probably due to formation of copper cyanides primarily.

At the end of the first 24 hours, titrated cyanide had declined to about 200 mg/l, and with subsequent additions of NaCN, further (slower) declines in titrated cyanide were observed, probably due to thiocyanate formation.

At the end of the test, the total cyanide in the filtrate was measured to be 2227 mg/l NaCN. Also the Cu concentration in the filtrate was analyzed as 802 mg/l Cu. From these assays, it is possible to consider if there is any active cyanide (see under Definition of Terms) present in solution at this stage, i.e. cyanide that is not otherwise complexed and therefore available for gold leaching.

In the sample taken at the end of the test, the total cyanide (on a weight basis) is insufficient to complex all the Cu as the tetracyano complex, i.e. it is less than 3.085 times the Cu concentration:

(i) 802 mg/l Cu×3.085=2474 mg/l NaCN required to complex all Cu as tetracyanide complex;

(ii) 2227 mg/l NaCN is the observed total cyanide; and (iii) Calculated active cyanide=2227−2474=−247 mg/l, i.e. negative.

However, this (−247 active cyanide) is the calculation for the end of the cyanide leach period, i.e. 48 hours, and no further additions were made for the last 20 hours, i.e. in the period 28-48 hours.

Figure 4:
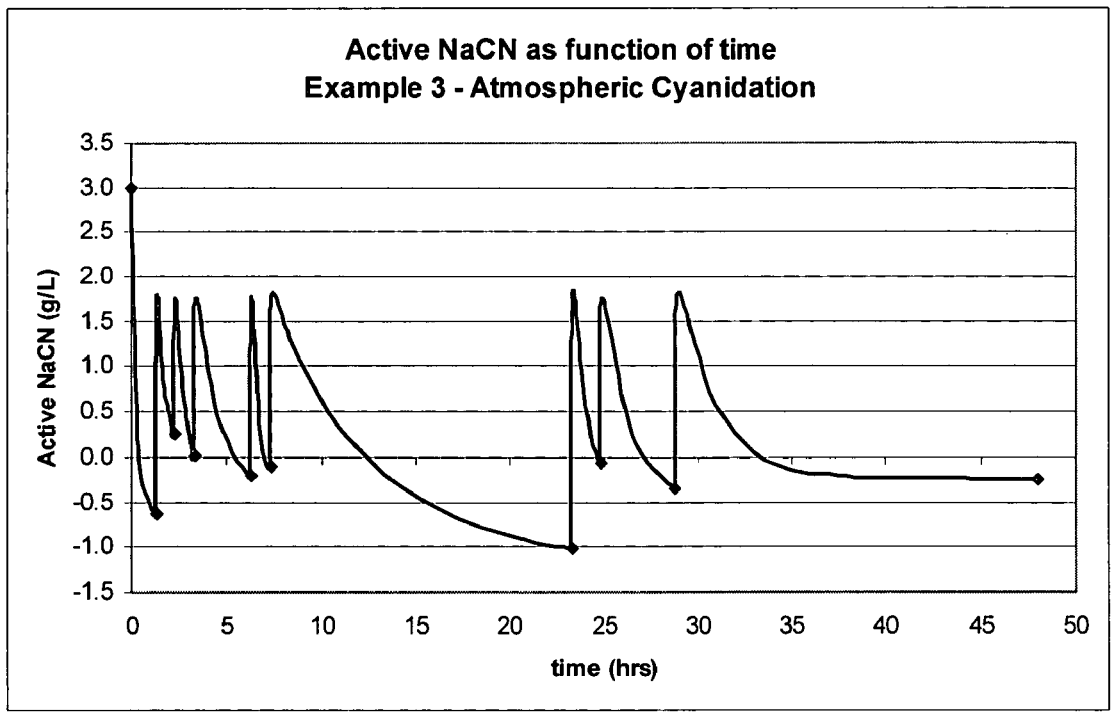
FIG. 4 is a graphical illustration of calculated active cyanide as a function of time in the cyanidation process of Example 3.

In FIG. 4 is shown the calculated active cyanide as a function of time. It varied from a low of −1000 mg/L NaCN (24 hours) up to +1700 mg/L, with an average of about +200 mg/L NaCN, very roughly.

Note: Active cyanide during the test was estimated using titrated cyanide procedure, with the assumption that the copper-cyanide complexes are titrated from $Cu(CN)_3^{-2}$ and $Cu(CN)_4^{-3}$ only down to the $Cu(CN)_2^-$ species. It was also assumed all the copper leaches into solution within the first hour, and thus the copper assay was used to determine the NaCN complexed with copper throughout the test. Active cyanide was calculated from the titrated cyanide value and deducting NaCN complexed as $Cu(CN)_2^-$.

d) Conclusions

The extra cyanide added resulted in good gold and silver extraction (91% and 98%) due to maintaining a positive active cyanide concentration during most of the cyanidation period. However, the reagent consumption was very high at 127 kg NaCN/t residue. Much of the cyanide was consumed by formation of copper cyanides and thiocyanate, but also there were "unaccounted" losses, probably due to HCN volatilization due to the very high cyanide concentrations employed in the solution and also due to the long retention time.

These conditions, with 9.5 g NaCN added overall to the leaching (cyanidation vessel) would not result in an economical process.

It is to be concluded therefore that the conventional cyanidation process on the copper residue, carried out at atmospheric (ambient) conditions of temperature and pressure, with long retention times, is capable of leaching gold and silver, but only if the active cyanide concentration is maintained positive.

Example 4

The previous three examples all employed batch mode for both the copper extraction (pressure oxidation) and gold and silver extraction (atmospheric cyanidation).

In this example the effect of a copper residue produced through a continuous pressure oxidation process on gold extraction and cyanide consumption during the gold leaching process is described. The procedure for the cyanidation was the same as in Example 3, with periodic additions of cyanide throughout the test period.

The pressure oxidation process used for this example is the process variation described above which does not include the subsequent acid leach.

a) Copper Leaching—Pilot Scale Continuous Mode

Copper concentrate I was reduced from as received 42%+ 37 microns (400 mesh) to 8%+37 microns by first screening using a oscillating screen equipped with a Tyler Series 325 mesh screen, and then grinding the repulped oversize solids in a continuous ball mill. The ground solids were thickened, and then recombined with the undersize solids to form 65% solids slurry, sufficiently fluid to be suitable for pumping into a pressure vessel.

The pressure vessel used for the pressure oxidation was a 66 L titanium autoclave with approximately 30 L active volume of slurry, after discounting space consumed by internals, gas volume above the slurry and gas entrainments in the slurry. The 30 cm diameter autoclave was of the horizontal, cylindrical design with five compartments that were of roughly equal size and separated by partition walls reaching to about 80% of the compartment height. Each compartment was equipped with mechanical agitators, baffles and oxygen spargers for efficient delivery and dispersion of oxygen into the slurry.

Provision was made for temperature control inside the vessel through internal coils connected to either heating or cooling sources, (as required), and for continuous but separate input of both feed streams, i.e. concentrate slurry and feed acid. Discharge was semi-continuous based on a level sensor in the last compartment, to maintain a constant level in the vessel.

Due to the small scale of the autoclave, heat loss due to radiation and convection is much higher than would be encountered on a commercial scale vessel. Although the exothermic nature of the pressure oxidation process allows for autogenous operation on a commercial scale, and indeed is a design criteria, in this pilot-scale autoclave the desired operating temperature of about 150° C. could only be achieved with the help of some external heating, to compensate for such heat losses. This extra heat can be supplied by internal heating of the slurry inside the autoclave (by steam or hot water via coils) or external preheating of the feed acid. The latter mode was used in this example, as the actual temperature of the slurry during operation is then an important indicator of oxidation proceeding satisfactorily (or not).

The 65% solids concentrate slurry was pumped into the autoclave and diluted to 130 g/L solids with an acidic $CuSO_4$—$CuCl_2$ stream (recycled from downstream in the process) containing 14 g/L Cu, 12 g/L Cl, 33 g/L free acid, and some other minor constituents accumulated during continuous closed loop operation of the copper process. The feed acid was heated to 115° C. before being pumped into the autoclave to achieve the desired operating temperature as described above.

A surfactant, Lignosol™, was added to the continuously fed slurry at a rate of approx. 1 g/L of the slurry, for sulphur dispersal. Half of the Lignosol™ was added prior to the autoclave and half was added into the second compartment.

Oxygen at a purity of 98% $O_2$ (balance mostly argon) was sparged into the 150° C. autoclave slurry under vigorous agitation to maintain a total pressure of about 1380 kPag (200 psig). The steam pressure above the slurry at this temperature is about 380 kPag (55 psig), leaving about 1000 kPa (145 psi) for the partial pressure of oxygen and other gases. Typically at steady state operation the oxygen content of the non-condensible gases in the autoclave is about 75-85%, with the balance being mostly inert gases such as nitrogen and argon, together with some carbon dioxide. Other gases may also be formed during the pressure oxidation. Nitrogen and argon in the gas phase are derived from the feed oxygen itself, typically starting at about 1-5%, but they accumulate during continuous operation due to the selective consumption of the oxygen, thereby decreasing the fraction of oxygen at steady state operation. To maintain oxygen at the 75-85% level, (and prevent it falling further), about 10-15% of the feed oxygen flow is bled out of the autoclave as a vent stream, to keep impurities such as nitrogen and argon from accumulating any further.

Carbon dioxide is usually formed inside the autoclave by reaction of carbonate minerals within the feed concentrate with the feed acid. Such carbonates are a common minor constituent in copper sulphide concentrates and as a result the carbon dioxide content in bleed gas is about 3-10%.

Retention time within the autoclave was approximately 60 minutes. Discharge from the autoclave was done on a semi-continuous basis into an un-pressurized flash tank, which released the overpressure of oxygen, etc and allowed steam to flash off until the slurry reaches ambient pressure, i.e. 1.0 atmosphere. This process cooled the slurry from operating temperature to about 95-100° C.

The slurry was transferred to a counter-current washing (CCD) circuit before the underflow was dewatered in a filter press. The filter cake was washed with fresh water. At a 60 minute retention time, the residue contained 1.61% copper, 12 g/t gold, and 58 g/t silver, at a 23% mass loss.

b) Gold and Silver Leaching—Batch Atmospheric Leach

A small sample (75 g) of the residue from the copper leaching was repulped to 150 g/L solids with fresh water, neutralized with 2.75 g lime to reach pH 10.6, and then subjected to atmospheric cyanidation.

The same procedure was used as outlined in Example 3, starting with 3000 mg/L NaCN and subsequently making periodic additions of NaCN as needed to maintain 3000 mg/L titrated cyanide as determined by titration. Upon completion of the 48 hour test, the slurry was filtered and washed with fresh water. The filter cake, filtrate, and wash water were analyzed, and the results are shown in Tables 5A, B and C.

c) Conclusions

Gold and silver extraction (88% and 96% respectively) for this example was excellent, similar to that of the batch-produced copper residue in Example 3. Gross cyanide consumption although still very high was, however, noticeably lower than in the previous example at 83 kg NaCN/tonne feed.

Cyanide loss due to thiocyanate, was similar to Example 3 at 33 kg/t, but losses due to copper cyanide and cyanate were substantially reduced at 7.8 kg/t and 0.5 kg/t respectively.

This indicates the positive benefit of continuous pressure oxidation (in the copper extraction part of the process), i.e. reduced formation of copper cyanide in the subsequent cyanidation.

Although gold extraction was good and cyanide consumption lower than the previous example, the cyanide consumption in this (atmospheric) cyanidation was still much too high for an economic process.

Example 5

This example illustrates continuous (Pilot Plant) operations (atmospheric) of both the copper and gold and silver leaching.

a) Copper Leaching—Pilot Scale Continuous Mode

Copper concentrate II (Table 1) was ground and subjected to pressure oxidation through the continuous autoclave as described in Example 4. The ground feed concentrate was repulped to 177 g/L solids using acid feed solution with composition: 17 g/L Cu, 17 g/L free acid, and 12 g/L chloride. The pyrite content in this concentrate was, however, much lower than Concentrate I, at 12%. The sulphur oxidation therefore was not sufficient to leach all the copper within the autoclave, as it was for Concentrate I, therefore a subsequent acid leaching step was required.

Autoclave residue of composition 13.9% Cu, 25.7% Fe, 19.1% elemental sulphur and 23.6% total sulphur was repulped in acidic raffinate (of composition 0.9 g/L Cu, 24 g/L free acid (FA), 1.1 g/L Cl, and 3.2 g/L Fe) to 50% solids and pumped to four atmospheric leach reactors in series. Additional raffinate was added to the reactors to maintain a pH of 1.7 to 1.8 in reactor No. 3 and leach the oxidized copper. The average retention time in the reactors was 72 minutes and average temperature 36° C. This atmospheric leach was not conducted under the improved conditions of enhanced leaching 16 described above but the normal atmospheric leach (AL) of the '708 patent.

The final reactor slurry was diluted with CCD (Counter-Current Decantation) wash liquor and mixed with coagulant and flocculant and solids washed using a standard CCD. Overflow (13 g/L Cu, 4 g/L FA, 1 g/L Cl, and 3.0 g/L Fe) from the first thickener was then fed to the primary solvent extraction unit. The washed solids (with composition as shown in Table 3) were pumped from the fourth thickener underflow to the flotation feed tank.

b) Flotation of Gold and Silver from Copper Process Residue

Subsequent to copper leaching, the atmospheric leach residue was subjected to flotation, to concentrate the gold and silver into a smaller mass, and thus reduce costs of gold and silver extractions.

Washed residue slurry (at 50% solids) resulting from the copper extraction was pumped to the Flotation conditioning tanks and then diluted to 30% solids using wash filtrate from the Flotation concentrate filter press operations. 75-150 g/t of Aero 5688™ collecting reagent and 25 to 100 g/t of Oreprep F-507™ frothing reagent were added to the conditioning tanks 15 to 30 minutes prior to processing the feed material. The conditioned slurry was fed to a series of 6 rougher cells. Compressed air at 3 to 6 cubic feet per minute was forced into each cell to promote the froth. The froth collected from the cells was pumped to a filter feed tank where it was later filtered. 54% of the feed weight was collected as concentrate, the remainder being discarded as tailings. Before transferring concentrate to cyanidation, the concentrate was washed with fresh water using a 4 L of wash to 1 L entrained solution ratio. The tailings stream, containing an un-economic quantity of gold was filtered by a pressure filter and discarded.

The metallurgical summary of the flotation step is shown in Table 3 below.

TABLE 3

Flotation Metallurgical Summary

| Stream | Au (g/t) | Ag (g/t) | Cu (%) | Fe (%) | S° (%) | $S^{TOTAL}$ (%) |
|---|---|---|---|---|---|---|
| AL Residue | 12.2 | 43.9 | 1.61 | 32.6 | 25.1 | 28.6 |
| Concentrate | 21.9 | 77.2 | 1.90 | 24.9 | 48.5 | 53.6 |
| Tailings | 1.57 | 6.7 | 1.27 | 39.9 | 2.9 | 6.1 |
| Recovery (%) | 94.1% | 93.0% | 63.7% | 43.7% | 94.7% | 90.2% |

*Recovery was based on tailings assays and mass recovery of 54%

The concentrate was recovered for gold/silver leaching as described below.

c) Gold and Silver Leaching—Continuous Atmospheric Cyanidation

In the continuous cyanidation portion of this example, a complete integrated flowsheet was tested, so that the feed solution to cyanidation is mostly recycled from within the process. This is illustrated in this example. Reference is made to FIG. 2 and the accompanying description.

However, it should be noted that in this example, the cyanidation process was still conducted at atmospheric pressure, (as in all previous examples to this point), whereas FIG. 2 and its accompanying description refer to pressure cyanidation using oxygen, which will be illustrated in later examples.

One difference from previous examples however, was that oxygen was sparged into the open reactors, rather than using ambient air. This was done in an effort to improve the gold recovery with this atmospheric cyanidation process.

It is to be noted that the recycled cyanide solution had a high concentration of byproducts of the process, notably SCN ions that had built up over time during repeated cyclic operations. During the cyanidation process the total cyanide concentration was monitored, and using this assay together with the Cu concentration assay, the active cyanide concentration was calculated. It was an objective of this test to maintain a positive active cyanide concentration at all times, as the recovery of gold and silver would seem to depend on having some free cyanide ions in solution at all times, i.e. available cyanide not complexed with Cu, for instance. Therefore the continuous process was conducted with this active cyanide monitoring done on a regular basis, with supplementary additions of fresh NaCN as needed to keep the active cyanide positive.

Residue from the copper extraction was repulped, with a recycled cyanide solution of composition: 6050 ppm total cyanide, (see under Definition of Terms), 4616 ppm SCN, 160 ppm Cu, and 21 ppm CNO, to a pulp density of 400 g/L solids. There was a retention time of 36 hours (cyanidation at atmospheric pressure) through six cascading reactors. An additional 5.4 g/L cyanide (as a concentrated solution of NaCN) was added to the first 3 reactors to maintain a positive active cyanide concentration. This additional cyanide was equivalent to 14.8 kg NaCN/t feed solids.

Oxygen was sparged into reactors 1 through 5 in order to provide oxygen-enriched leaching conditions with a target of 20 ppm dissolved oxygen. Two methods of gold/silver recovery were employed during this time of operations, Carbon-in-Pulp (CIP), and Carbon-in-Column (CIC). Activated coconut shell carbon was used to recover the dissolved metals (gold, silver, copper).

The cyanidation product slurry was filtered, followed by a three stage wash with a 1.8:1 L/L wash ratio. The filtrate contained 6840 ppm total cyanide, 7380 ppm SCN, 2216 ppm Cu, 101 ppm CNO, 3.3 mg/L Au and 15 mg/L Ag, during CIC operations.

The washed residue was treated with a peroxide solution in order to destroy any entrained cyanide so that the solids would meet environmental disposal regulations.

Gold and silver extractions for this example were poor, at 61% and 53% respectively. Low extractions were likely due to the low active cyanide content. Cyanide losses due to thiocyanate were moderately high, 6.2 kg/t, but would likely have been much higher still if the levels of cyanide were increased further. Copper dissolution was also high, at 2056 mg/L delta (on a diluted basis). This meant that a minimum of 6 g/L total cyanide was required in solution. This high cyanide concentration would in turn lead to volatile losses at a much quicker rate than if the concentration was at a more manageable 2-3 g/L in solution.

The term "delta" or symbol "Δ" used in this specification refers to the difference between product concentration of some element or ion in solution and feed concentration of the same substance: i.e. delta=concentration of product minus concentration of feed. Therefore the above value of 2056 mg/L delta Cu, means there is 2056 mg/L more Cu in solution after the cyanidation step than Cu in the feed going into the cyanidation.

The results are shown in Tables 5A, B and C.

d) Conclusions

Gold extraction using continuous pressure oxidation and continuous atmospheric cyanidation was poor, at 61%. The cyanidation process used high amounts of cyanide in order to maintain positive active cyanide at all times, i.e. cyanide available in solution to leach gold and silver.

In addition to low gold extraction, the thiocyanate production was also high, showing no improvement over the batch processes. Thus the reagent consumptions were too high for an economical process.

Example 6

The following example describes the use pressure cyanidation (PCN) instead of atmospheric cyanidation (ACN) for gold and silver recovery.

a) Copper Leaching—Batch Mode

Copper concentrate I was ground and subjected to batch pressure oxidation under the same conditions given in Example 1. Following pressure oxidation, the slurry was filtered, and washed with water, producing a residue containing 1.15% copper, 10.9 g/t gold and 41 g/t silver, a primary filtrate and a wash filtrate.

b) Gold and Silver Leaching—Batch Pressure Leach 80 g of the copper-leached residue was mixed with 374 mL fresh water to achieve a slurry density of 200 g/L. This slurry was then brought to a pH of 10.6 using lime (CaO) slurry. 0.8 g of sodium cyanide was added to achieve an initial concentration of 2 g NaCN/L. The slurry was transferred to a 1.0 L stainless steel pressure vessel and sealed. The pressure was increased to 3700 kPag (500 psig) oxygen pressure under mild agitation and at ambient temperature (20° C.). Throughout the first 65 minutes of the 90 minute leach, cyanide solution was pumped in at 2.2 mL/minute at 5.8 g/L NaCN. No further additions were made during the final 25 minutes. Final solids density was 147 g/L solids. Upon completion of the cyanide leach, the pressure was slowly released and the slurry filtered and washed to produce 84 g of residue containing 0.81% Cu, 4.1 g/t Au, and 19 g/t Ag, 450 mL of filtrate containing 2230 ppm total cyanide, 890 ppm Cu, 41 ppm SCN, 0.85 ppm Au, 5.2 ppm Ag, and 149 ppm CNO, and 1450 mL wash water containing 126 ppm total cyanide, 48 ppm Cu, 5 ppm SCN, <0.1 ppm Au, 0.3 ppm Ag, and 8 ppm CNO.

Gold extraction was 60% and silver extraction 55% for this example. Gross cyanide consumption was 20 kg/t, with 17 kg NaCN/tonne feed lost due to complexation with copper. Thiocyanate production was very low, at 0.3 kg/t. Cyanate production was 1 kg/t.

c) Conclusions

Gold extraction at 60% was lower than desired, (using pressure cyanidation following a batch pressure oxidation process for copper), but similar to the result obtained from the comparable test using atmospheric cyanidation, (Example 2, 58% gold extraction) under similar cyanide concentrations. The reagent consumption due to formation of thiocyanate, however, was much lower than was seen with atmospheric cyanidation Example 2 (0.3 kg SCN/t feed solids compared to 12 kg/t in Example 2).

Example 7

This example illustrates the improvements in gold and silver extraction resulting from using a continuous pressure oxidation process (rather than batch) to produce a residue for subsequent pressure cyanidation.

a) Copper Leaching—Pilot Scale Continuous Mode

Copper concentrate I was subjected to the continuous pressure oxidation process as described in Example 4. The resultant residue contained 1.25% Cu, 10.8 g/t Au, and 34 g/t Ag, at approximately 80% of the initial concentrate weight.

b) Gold and Silver Leaching—Batch Pressure Cyanidation (Fresh Solution)

Cyanidation of the copper plant residue was done under pressurized conditions as described in Example 6, (batch mode). Results are shown in Tables 5A, B and C.

Gold and silver leaching was 80% and 92% respectively. Gross cyanide consumption was 19 kg/t. Cyanide consumption due to thiocyanate formation was 1.7 kg/t, due to copper 2.8 kg/t and to cyanate formation 0.2 kg/t feed solids.

c) Conclusions

Gold extraction in this example was significantly better than extraction obtained in Example 6 using batch produced copper residue. In addition, the cyanide consumption due to copper cyanide formation was less with the continuous autoclave—produced copper residue. The conditions used would provide for an economical process. This illustrates the improvement in gold processing by using a continuous pressure oxidation process for copper leaching.

Example 8

The results of continuous pressure cyanidation is shown in this example, and illustrate the differences between batch and continuous modes of operation. Reference is made to FIGS. 1 and 2 to clarify the process flowsheet used in the example.

a) Copper Leaching—Pilot Scale Continuous Mode

Copper concentrate I was ground and processed by continuous pressure oxidation as described in Example 4. The residue contained 1.37% Cu, 34.1% Fe, 32.4% total S, 11.9 g/t Au, and 62 g/t Ag, at approximately 80% of the initial concentrate weight.

b) Gold and Silver Leaching—Continuous Pilot Plant Operations 1.2 kg/hr of copper plant residue (dry basis), at 20% moisture was repulped to 600 g/L with 1.2 L/hr NaCN recycled wash water and barren solution to make a 150 g/L slurry. Lime slurry at 266 g/L solids was added to this tank at an approximate rate of 43 kg/t feed solids (0.16 L/hr), to achieve a target pH of 10.5. This slurry was continuously pumped into a pressure vessel with 2.3 L/hr recycled AVR solution (stream 73 in FIG. 2) at 2.4 g/L NaCN and 3.7 L/hr barren solution (stream 106) at 2.7 g/L NaCN. The pressure was maintained at 500 psig using oxygen, at ambient temperature (20° C.). Within the pressure vessel, 25 g/L NaCN solution was added at a rate of 6.8 kg/t solids. A 90 minute autoclave retention time was used for this test. After being discharged from the autoclave into an atmospheric pressure tank, where oxygen overpressure was released to atmosphere, the leached slurry was dewatered in a filter press as soon as possible. In practice, this occurred, within 60 minutes of being discharged. The filter cake was washed with a one-stage wash using 1.3 L/hr barren solution and a three stage wash using 0.8 L/hr fresh water. The resultant filter cake contained 24% moisture and was assayed to be 1.24% Cu, 34.4% Fe, 30.7% total S, 2.45 g/t Au and 4.0 g/t Ag. The barren wash filtrate was combined with the pregnant filtrate and passed through carbon columns for recovery of gold and silver by absorption, producing a barren solution with less than 0.05 mg/L gold. Assays for the combined feed solution to the Carbon-in-Column (CIC) circuit were; 610 mg/L Cu, 2100 mg/L SCN, 130 mg/L CNO, 2700 mg/L total NaCN, 800 mg/L active NaCN, 1.2 mg/L Au and 9.4 mg/L Ag. The fresh wash water was recycled to be used as repulp water for the slurry tank.

Gold extraction was 79% and silver extraction 94%. Thiocyanate formation was 2.8 kg/t, copper leaching 0.7 kg/t and 0.2 kg/t CNO was formed. Of the 23.4 kg total NaCN added per tonne feed solids, 3.0 kg/t was lost due to SCN and CNO, 2.2 kg/t due to copper, and 0.7 kg/t was lost due to unknown sources.

c) Solution Recycling and Recovery of Cyanide Associated with Copper

As demonstrated in the present example, gold leaching was high and reagent consumption satisfactory when using pressure cyanidation of gold on copper extraction residues processed through a continuous autoclave.

Other aspects of this invention are further improvements in the reduction of cyanide consumption, namely (i) the recycling of solutions to utilize remaining cyanide left in solution, and (ii) recovery of the cyanide associated with copper cyanide complexes.

Both reagent saving methods are illustrated in this example.

Recycling of Solutions

After recovery of the gold and silver in the CIC circuit, 65% the barren solution was split into several recycle streams, including: washing the filter cake, repulping fresh solids, and diluting the slurry in the autoclave. The remaining 35% of the barren solution was treated for copper recovery (see following section). Recycling of the barren solution (all streams) recovered 16.7 kg NaCN/tonne feed (71% of total cyanide required in pressure cyanidation), thus reducing the cyanide consumption from 23.4 to 6.7 kg NaCN/tonne feed, not including recovery of cyanide associated with copper.

Recovery of Cyanide Associated with Copper

The gross cyanide consumption for the present example was 23.4 kg/t feed solids. Recovery of the cyanide associated with copper further reduces the cyanide consumption. The Acidification-Volatilization-Reneutralization (AVR) circuit, as described above with reference to cyanide recovery caused the cyanide associated with copper to dissociate and volatilize, forming HCN gas and cuprous ions. The copper remaining in solution precipitated as CuSCN. The HCN gas was then stripped from the acidified slurry and absorbed in caustic to reform NaCN to be returned to the gold recovery process. Use of the AVR circuit on Concentrate I reduced the cyanide consumption by 2.2 kg NaCN/t, to a net consumption of 6.8 kg NaCN/tonne solids.

d) Conclusions

Continuous pressure cyanidation showed comparable gold recovery and thiocyanate formation to the batch pressure cyanidation example. Continuous copper extraction operations and pressure cyanidation were shown to be the optimal combination for achieving high gold extraction with low cyanide consumption. Using both recycled solutions and recovering the cyanide associated with copper during gold and silver recovery, reduced the cyanide consumption from 23.4 to 5.4 kg/tonne solids.

Example 9

Copper concentrates low in pyrite will generally not fully leach within the pressure oxidation autoclave, and a separate acid leaching process is required to solubilize Cu, e.g. an atmospheric leach (AL).

This example describes the effect of pressure cyanidation on such a concentrate, but in conjunction with a subsequent atmospheric leach after the pressure oxidation.

a) Copper Leaching

Copper concentrate II with a composition shown in Table 1, was ground and slurried with recycled acid as part of the continuous copper extraction process as described in Example 5. During operations, a sample of the autoclave discharge slurry was filtered and washed with condensate, producing a chloride-free cake and a chloride containing filtrate. Approximately 50% of the copper remained in the filtrate and 50% was leached in the autoclave. The filter cake of composition (15.3% Cu, 23.6% Fe) was split, where a portion was subjected to an acid leach at atmospheric pressure (AL) under batch conditions. (The other portion was reserved for Example 10, below)

Conditions used for the batch leach was 150 g/L solids, 1 hour retention time, and sulphuric acid added to achieve and maintain pH of 1.5 at 40° C. Upon completion of the leach, the sample was filtered and washed, producing 108.7 g of filter cake (dry basis), 950 ml of a primary filtrate (18.7 g/L Cu, 21 g/L FA), and 1550 ml of wash water (0.9 g/L Cu, 0.8 g/L FA).

The residue which contained 1.54% copper, 15.4 g/t gold, and 31 g/t silver was then subjected to gold and silver leaching.

b) Gold and Silver Leaching

Residue from copper leaching (1.54% Cu, 15.4 g/t Au, 31 g/t Ag) was repulped to 400 g/L solids and brought to a pH of 9.6-10 using lime. The slurry was subjected to cyanidation as described in Example 6. Initial cyanide concentration was 1.3 g/L, increasing to 2.0 g/L after 45 minutes of the 60 minute test. Final solids density was 100 g/L solids. Upon completion of the retention time, the slurry was filtered and washed, producing a filter cake, filtrate and wash. Filtrate assays were 267 mg/L Cu, 84 mg/L SCN, 1.0 mg/L Au, 3.1 mg/L Ag, and an active cyanide concentration of 403 mg/L. The product solids contained 1.27 g/t Au and 0.1 g/t Ag, corresponding to gold extraction of 91.6% and silver extraction of 99.8%.

Cyanide consumption was 11.5 kg due to copper leaching (3.7 kg Cu/tonne leaching).

Refer to Tables 5A, B and C for a summary of results.

c) Conclusions

Cyanide consumption during gold and silver extraction was high, due to high levels of copper leaching during the cyanidation process, resulting from the use of previously described atmospheric leach (AL) during copper extraction.

Example 10

Use of Enhanced Atmospheric Leach

This example describes the improvements made to the atmospheric leaching stage (AL) and the effect of these changes on copper leaching in cyanidation.

a) Copper Leaching

Copper concentrate II was subjected to pressure oxidation under conditions described in Example 9. The same filtered autoclave sample used for Example 9 was used for the present Example. The enhanced atmospheric leach conditions were, however as shown in Table 4 below:

TABLE 4

Operating Conditions for Enhanced Atmospheric Leach

| Solids Density (g/L) | [Cl] (g/L) | Temperature (° C.) | pH | RT (hr) |
|---|---|---|---|---|
| 150 | 5 | 70 | 1.5 | 2 |

The resultant slurry was filtered and washed as described in Example 9, producing a residue containing 1.27% Cu, in comparison with 1.54% as was the case with the standard atmospheric leach (AL).

b) Gold and Silver Leaching

The residue from copper leaching was subjected to cyanidation as described in Example 9. Copper leaching during the cyanidation process was 175 mg/L (1.9 kg/t), only half that as seen in Example 9. NaCN losses due to copper losses were 5.9 kg/t in this example, as compared to 11.5 kg/t in Example 9. Gold and silver extraction and thiocyanate formation are comparable for the two methods. The filtrate contained 1.0 mg/L Au, 0.9 mg/L Ag, 113 mg/L SCN (1.2 kg/t), 71 mg/L CNO (0.1 kg/t), and an active cyanide concentration of 593 mg/L. The filter cake contained 1.28 g/t gold and 0.5 g/t Ag, corresponding to 91.5% gold and 94.6% silver recovery.

c) Conclusions

The enhanced atmospheric leach reduced the copper leaching in the subsequent pressure cyanidation by nearly 50% and is an improvement over existing technology for concentrates which require an atmospheric leach following pressure oxidation. The effect of enhanced atmospheric leach is to remove the copper from the residue that would otherwise leach during the pressure cyanidation. This is only a part of the copper that is present in the residue.

Summary of Results for Examples 1-10

Tables 5A, 5B and 5C provide details of the conditions and results for Examples 1 through 10.

TABLE 5A

Summary of Conditions for Examples 1–10

| | | | | | Cyanidation Conditions | | | | | |
|---|---|---|---|---|---|---|---|---|---|---|
| Example | PO | batch/ continuous | feed liquor | method | NaCN conc. | RT (min) | final Solids density (g/L) | Initial NaCN (g/L) | total NaCN dosage (g/L) | NaCN addition method |
| 1 | batch | batch | fresh | ACN | low | 72 hr | 400 | 0.25 | 0.25 | 100% beginning |
| 2 | batch | batch | fresh | ACN | medium | 66 hr | 400 | 0.5 | 5.0 | 10% initial, 90% added throughout first 60 hrs of test |
| 3 | batch | batch | fresh | ACN | high | 48 hr | 114 | 3.0 | 15.1 | maintain 3 g/L titrated NaCN |
| 4 | cont | batch | fresh | ACN | high | 48 hr | 121 | 3.0 | 10.6 | maintain 3 g/L titrated NaCN |
| 5 | cont | cont | recycled | ACN | high | 24.36 hrs | 405 | 3.9 | 9.4 | maintain positive Active NaCN level |
| 6 | batch | batch | fresh | PCN | medium | 90 | 150 | 2.0 | 3.0 | continuous addition for 60 of the 90 min RT |
| 7 | cont | batch | fresh | PCN | medium | 90 | 150 | 2.0 | 3.0 | continuous addition for 60 of the 90 min RT |
| 8 | cont | cont | recycled | PCN | medium | 90 | 150 | 2.4 | 3.4 | 74% initial, 26% in 3rd of 5 compartment autoclave |
| 9 | cont | batch | fresh | PCN | medium | 60 | 100 | 1.3 | 2.0 | continuous addition for 45 of the 60 min RT |
| 10 | cont | batch | fresh | PCN | medium | 60 | 100 | 1.3 | 2.0 | continuous addition for 45 of the 60 min RT |

TABLE 5B

Summary of Results for Examples 1–10

| | Feed solids | | Product Solids | | Pregnant solution | | Extraction* | |
|---|---|---|---|---|---|---|---|---|
| Example | g/t Au | g/t Ag | g/t Au | g/t Ag | mg/L Au | mg/L Ag | Au | Ag |
| 1 | 10 | 45.3 | 8.23 | 24.8 | 0.66 | 8.3 | 15.0% | 42.0% |
| 2 | 10.5 | 43.4 | 4.22 | 6.2 | 1.47 | 10.2 | 58.1% | 85.1% |

TABLE 5B-continued

Summary of Results for Examples 1–10

| | Feed solids | | Product Solids | | Pregnant solution | | Extraction* | |
|---|---|---|---|---|---|---|---|---|
| Example | g/t Au | g/t Ag | g/t Au | g/t Ag | mg/L Au | mg/L Ag | Au | Ag |
| 3 | 10.5 | 56 | 0.92 | 1.1 | 1.39 | 8.8 | 90.8% | 97.9% |
| 4 | 12 | 58 | 1.45 | 2.2 | 1.72 | 10 | 88.4% | 96.4% |
| 5 | 21 | 73 | 8.0 | 33 | 3.3 | 15 | 60.7% | 53.4% |
| 6 | 10.9 | 41 | 4.12 | 18.6 | 0.85 | 5.2 | 60.1% | 55.0% |
| 7 | 11.8 | 31.3 | 2.33 | 2.6 | 1.23 | 4.3 | 80.3% | 91.7% |
| 8 | 11.9 | 62.3 | 2.45 | 4 | 1.22 | 9.4 | 78.5% | 93.9% |
| 9 | 15.4 | 31 | 1.27 | 0.1 | 1 | 3.1 | 91.6% | 99.8% |
| 10 | 14.8 | 9 | 1.28 | 0.5 | 1 | 0.9 | 91.5% | 94.6% |

*Extraction was based on solids. There was a small mass gain due to lime addition during the tests

TABLE 5C

Summary of Results for Examples 1–10, continued

| | SCN | | Cu | | CNO | | Final Concentrations | |
|---|---|---|---|---|---|---|---|---|
| Example | filtrate mg/L | Production kg/t feed* | Filtrate mg/L | Extraction kg/t feed* | Filtrate mg/L | Production kg/t feed* | total NaCN mg/L | active NaCN mg/L |
| 1 | 8 | <0.1 | 77 | 0.2 | 28 | 0.1 | 166 | −72 |
| 2 | 3500 | 14.2 | 1098 | 4.5 | 169 | 0.7 | 2796 | −594 |
| 3 | 5040 | 33.6 | 802 | 5.4 | 183 | 1.6 | 2227 | −249 |
| 4 | 5890 | 38.5 | 385 | 2.5 | 54 | 0.5 | 2160 | 971 |
| 5 | 2764 | 7.3 | 2056 | 5.6 | 80 | 0.2 | 6840 | 15 |
| 6 | 41 | 0.3 | 890 | 5.9 | 149 | 1.0 | 2230 | −518 |
| 7 | 310 | 2.0 | 137 | 0.9 | 28 | 0.2 | 1813 | 1390 |
| 8 | 495 | 2.8 | 156 | 0.7 | 3 | 0.2 | 2700 | 1108 |
| 9 | 84 | 0.8 | 267 | 3.7 | 104 | 0.2 | 1407 | 403 |
| 10 | 113 | 1.2 | 175 | 1.9 | 71 | 0.7 | 1133 | 593 |

| | Cyanide Consumption (kg NaCN/t feed) | | | | |
|---|---|---|---|---|---|
| Example | gross NaCN | NaCN loss to Cu** | NaCN loss to CNO + SCN | All other losses*** | Total Net NaCN loss**** |
| 1 | 0.5 | 0.4 | <0.1 | 0.1 | 0.2 |
| 2 | 17.6 | 2.1 | 13 | 2.6 | 17.6 |
| 3 | 127.1 | 16.8 | 30.3 | 19.1 | 66.1 |
| 4 | 83.1 | 7.8 | 33 | 36.0 | 76.9 |
| 5 | 25.5 | 17.2 | 6.4 | 1.9 | 25.5 |
| 6 | 19.5 | 17.1 | 1.4 | 1.0 | 19.5 |
| 7 | 19.0 | 2.8 | 2.0 | 1.0 | 5.7 |
| 8 | 23.4 | 2.2 | 3.0 | 1.2 | 6.3 |
| 9 | 18.7 | 11.5 | 0.9 | 0.9 | 13.3 |
| 10 | 18.8 | 5.9 | 1.8 | 0.9 | 8.6 |

Notes

For examples 5 & 8, reported filtrate assays represent increases across PCN circuit (delta SCN, etc)

*kg/t NaCN consumptions include wash water in calculations

**NaCN loss due to Cu assumes the tetra-cyano species (when enough NaCN is available)

***assumed volatile NaCN losses are 5% of gross NaCN for PCN and 15% of gross NaCN for ACN. Includes volatile losses, entrainment losses

****Total net NaCN loss is the loss of NaCN due to Cu, SCN, CNO, plus estimated volatilization loss

Example 11

Variations of Gold/Silver Extraction Process for Different Feed Materials

The invention will now be illustrated by summarizing results of tests carried out on a continuous basis in a pilot plant. The process of the invention may be varied according to the feed material, for optimal results.

The copper extraction process may be varied according to the extent of sulphur oxidation that occurs during pressure oxidation, as described earlier. If sulphur oxidation is particularly low, a second acid leaching step, e.g. the enhanced atmospheric leaching 16, is preferred, whereas if sulphur oxidation is higher, no such step is needed, since all copper in the concentrate goes into solution during pressure oxidation The gold and silver extraction process may be varied according to the degree of leaching of copper encountered during pressure cyanidation and the amount of thiocyanate that is formed in this step.

It is desirable to have not more than about 3000-4000 mg/L total NaCN in solution during pressure cyanidation, to limit cyanide losses due to volatilization and entrained liquor in residues. In general, most of the total NaCN in solution is actually complexed with Cu as copper cyanide as explained above, so the amount of copper leaching in pressure cyanidation determines the total NaCN in solution to a large extent.

With different residues from the Cu extraction process, the degree of Cu leaching and S leaching encountered in PCN is quite variable, and to optimize the process, the flowsheet is modified or fine-tuned to each feed material.

When Cu leaching in cyanidation is high, i.e. about 0.3% absolute value, or about 20% of Cu present in residue, it is a preferred embodiment of the invention to reduce the solids density in pressure cyanidation, (PCN), so as to keep the total NaCN in solution below the desired upper limit of 3000 mg/L. In such cases, solids density in PCN may be 100-200 g/L solids.

Conversely, when Cu leaching in cyanidation is low, e.g. <0.1% Cu absolute value or less than 7% of Cu normally present in the residue, it is preferred to increase solids density in PCN to 200-400 g/L solids, for example. This increase in solids is made possible because the resultant total NaCN in solution is kept low by the reduced Cu leaching. The advantage then is a smaller solution flow, for a given solids treatment rate, and hence a smaller amount of solution that must be processed, leading to reduced capital and operating costs.

In addition, the details of the treatment of barren solution, for recycling and recovery of cyanides, vary according to the same parameters, (Cu and S leaching in PCN). Low % of Cu leaching leads to a reduced need for acidification, neutralization, etc, (i.e. the AVR process), and a greater proportion of barren liquor that can be recycled directly to PCN without the need for these operations (all of which consume reagents and therefore add to the cost of the process). In particular the split of barren between the stream going back to PCN without treatment, (at no cost), and the stream going to AVR, can be varied from 25/75 to 75/25.

These variations are illustrated in the following example, which summarizes the treatment of three different concentrates.

a) Copper Extraction Process

The three concentrates that were tested are shown as I, III and IV in Table 1.

For each concentrate, the copper extraction process was carried out in continuous mode in the Pilot plant, as described in Examples 9 and 10 above. Concentrate I exhibited high sulphur oxidation and was processed according to the process variation i.e. where no atmospheric acid leach is involved after pressure oxidation, whereas Concentrates III and IV required the enhanced atmospheric leach 16.

Recovery of Cu was 95.0% for concentrate I, 95.8% for concentrate III and 96.5% for concentrate IV.

Final Cu residues are tabulated in the Table below. Of note, Concentrate III had an additional enhanced atmospheric leach 16 after the standard atmospheric each (AL).

TABLE 6

Feed Materials to Gold and Silver Extraction Process

|  | I | III | IV |
|---|---|---|---|
| Copper | 1.29% | 1.11% | 1.25% |
| Iron | 34% | 35% | 34.60% |
| total Sulphur | 32.4% | 27.3% | 31.0% |
| Gold (g/t) | 11.9 | 9.7 | 6.2 |
| Silver (g/t) | 62 | 34 | 9.5 | b) Gold/Silver Extraction Process

The process used for each of the three different feed materials, Concentrates I, III, IV, is described below. Stream numbers (reference numerals) in brackets relate to FIG. 2. Data for each feed material can be found in Tables 7A and B for Concentrate I, Tables 8A and B for Concentrate III and Tables 9A and B for Concentrate IV.

TABLE 7A

Solutions Balance - Concentrate I

| Stream # | 56 | 71 | 73 | 76 | 85 | 86 | 87 | 101 | 104 | 105 | 113 | 119 |
|---|---|---|---|---|---|---|---|---|---|---|---|---|
| Volume (L) |  | x |  |  | 2.5 | 1 | 1.5 | x | 4.7 | 1.4 | 0.004 | 2.5 |
| [Cu] | 620 | x |  | 620 | 27 | 27 | 27 | x | 620 | x | 0 | 620 |
| [SCN] | 2100 | x | 1170 | 2100 | 1480 | 1480 | 1480 | x | 2100 | x | 0 | 2100 |
| [total NaCN] | 2722 | x | 5400 | 2722 | 2950 | 2950 | 2950 | x | 2722 | x | 0 | 2722 |
| [active NaCN] | 800 | x | 5366 | 800 | 2866 | 2866 | 2866 | x | 800 | x | 0 | 800 |
| g/L solids | 0 | 150 | 0 | 0 | 0 | 0 | 0 | 600 | 0 | 0 | 0 | 0 |

TABLE 7B

Solids Balance - Concentrate I

| Stream # | 54 | 58 | 102 | 103 | 112 | 117 |
|---|---|---|---|---|---|---|
| weight (g) | 1000 | 43 | 3 | 5.4 | 5 | 1043 |
| Cu (%) | 1.29% | 0 | x | 0 | 0 | 1.11% |
| Fe (%) | 34% | 0 | x | 0 | 0 | 35% |
| total S (%) | 32.4% | 0 | x | 0 | 0 | 30.5% |
| Au (g/t) | 11.9 | 0 | x | 0 | 0 | 2.3 |
| Ag (g/t) | 62 | 0 | x | 0 | 0 | 8 |

TABLE 8A

Solutions Balance - Concentrate III

| | \multicolumn{12}{c}{Stream #} |
|---|---|---|---|---|---|---|---|---|---|---|---|---|
| | 56 | 71 | 73 | 76 | 85 | 86 | 87 | 101 | 104 | 105 | 113 | 119 |
| Volume (L) | 1.9 | x | 0.9 | 2.4 | 0.7 | 0.3 | x | x | 1.9 | 1.2 | 0.0014 | 0.2 |
| [Cu] | 740 | x | 674 | 740 | 50 | 740 | x | x | 740 | 740 | 0 | 740 |
| [SCN] | 900 | x | 673 | 900 | 250 | 900 | x | x | 900 | 900 | 0 | 900 |
| [total NaCN] | 2800 | x | 3934 | 2800 | 2600 | 2800 | x | x | 2800 | 2800 | 0 | 2800 |
| [active NaCN] | 500 | x | 1845 | 500 | 2445 | 500 | x | x | 500 | 500 | 0 | 500 |
| g/L solids | 0 | 400 | 0 | 0 | 0 | 0 | x | 600 | 0 | 0 | 0 | 0 |

TABLE 8B

Solids Balance - Concentrate III

| | Stream # | | | | | |
|---|---|---|---|---|---|---|
| | 54 | 58 | 102 | 103 | 112 | 117 |
| weight (g) | 1000 | 42 | 0.5 | 2.4 | 1.4 | 1040 |
| Cu (%) | 1.11% | 0 | x | 0 | 0 | 1.06% |
| Fe (%) | 35% | 0 | x | 0 | 0 | x |
| total S (%) | 27.3% | 0 | x | 0 | 0 | x |
| Au (g/t) | 9.7 | 0 | x | 0 | 0 | 1.0 |
| Ag (g/t) | 34 | 0 | x | 0 | 0 | x |

TABLE 9A

Solutions Balance - Concentrate IV

| | \multicolumn{12}{c}{Stream #} |
|---|---|---|---|---|---|---|---|---|---|---|---|---|
| | 56 | 71 | 73 | 76 | 85 | 86 | 87 | 101 | 104 | 105 | 113 | 119 |
| Volume (L) | x | x | 1 | 3.4 | 1.4 | 0.9 | 0.5 | x | 2.1 | 0.5 | 0.004 | 1.4 |
| [Cu] | 480 | x | 135 | 480 | 62 | 62 | 62 | x | 480 | x | 0 | 480 |
| [SCN] | 2000 | x | 1500 | 2000 | 1500 | 1500 | 1500 | x | 2000 | x | 0 | 2000 |
| [total NaCN] | 2028 | x | 2500 | 2028 | 1800 | 1800 | 1800 | x | 2028 | x | 0 | 2028 |
| [active NaCN] | 540 | x | 2200 | 540 | 1608 | 1608 | 1608 | x | 540 | x | 0 | 540 |
| g/L solids | 0 | 150 | 0 | 0 | 0 | 0 | 0 | 600 | 0 | x | 0 | 0 |

TABLE 9B

Solids Balance - Concentrate IV

| | Stream # | | | | | | | |
|---|---|---|---|---|---|---|---|---|
| | 31 | 52 | 54 | 58 | 102 | 103 | 112 | 117 |
| weight (g) | 1000 | 420 | 580 | 23 | 3 | 2.8 | 3.2 | 1023 |
| Cu (%) | 1.25% | 1.44% | 1.05% | 0 | 0 | 0 | 0 | 0.94% |
| Fe (%) | 35% | 44.3% | 25.4% | 0 | 0 | 0 | 0 | x |
| total S (%) | 31.0% | 7.2% | 53.0% | 0 | 0 | 0 | 0 | x |
| Au (g/t) | 6.2 | 0.7 | 11.1 | 0 | 0 | 0 | 0 | 1.0 |
| Ag (g/t) | 9.5 | 1.8 | 16 | 0 | 0 | 0 | 0 | x |

The copper extraction residue from Concentrate IV, was quite low grade and was subjected to flotation, where 95% of the gold was recovered to the concentrate in 58% of the mass. The tails, containing 5% of the gold, were discarded as final residue. Because the gold content of Concentrates I and III was relatively high, the flotation step was omitted and therefore the entire copper extraction residues in these cases required treatment through the gold and silver extraction.

Feed material (54) to the gold and silver extraction process was slurried (60) to 600 g/L solids using recycled barren solution (56). Slaked lime (58) was added to the slurry to reach a pH of 10.5. The slurry was pumped into a pressure vessel (70) and combined with recycled cyanide solution (73) and barren solution (106) to achieve a target solids density as shown in Table 10. Cyanide losses throughout the circuit were replenished through the addition of 25 g/L cyanide solution (103). The reaction vessel was maintained at an oxygen overpressure of 3450 kPag or 500 psig (116). Reaction time in the pressure vessel varied from 60 to 120 minutes, dependent on the dissolution rate of gold, which was different for each concentrate.

Slurry (71) was continuously discharged from the pressure vessel and into a small holding tank prior to filtration. The slurry was filtered (72), washed once with barren solution (105) and once with fresh water (115). The PCN residue cake (117), containing less than 0.2 ppm gold, was disposed as tailings. The combined filtrates (118) were passed through a series of carbon absorption columns (74) where the gold and silver was recovered from solution onto the loaded carbon, which was withdrawn periodically. The loaded carbon would be suitable for the commercially proven steps of elution and gold/silver electrowinning, to return a stripped carbon to the columns, as per known technology.

A portion of the barren solution (132) was directed to acidification and precipitation of Cu and SCN (78). The amount of solution was contingent on copper leaching during the cyanidation step as to maintain total cyanide in the circuit below 3 g/L. For reasons not fully understood as yet, the copper dissolution in pressure cyanidation varies considerably between concentrates, affecting the amount of solution which requires copper removal. The remaining barren solution which did not undergo copper removal was recycled in a number of ways: It was used to provide barren wash water (105) for washing soluble gold from the residue filter cake in the filter (72), recycle cyanide solution (106) for pressure cyanidation, and repulp solution (56) for the feed material.

In the acidification and precipitation step, the barren solution was acidified to a pH between 2 and 4 (78) using sulphuric acid (113), causing the copper-cyanide complexes to dissociate forming free cyanide as HCN. The soluble copper precipitated with the thiocyanate present in solution to form CuSCN solid phase, and to a much lesser extent, with cyanide in solution, to form CuCN solid phase. The slurry (including the vapor phase) was passed through a filter (84), producing a filter cake (82) containing CuSCN and CuCN, which is recycled to the copper extraction autoclave, pressure oxidation, for copper recovery, and an acidified filtrate now very low in copper, and also reduced in thiocyanate (85).

A portion (87) of the filtrate was passed through an HCN stripper (92), for the purpose of removing the majority of the cyanide prior to cyanide destruct and discharge. This stream provides a bleed from the circuit to control impurity buildup and a water outlet, which allows for an overall water balance in the gold circuit.

The other fraction (86) of acidified filtrate was neutralized (89) with caustic and recycled (73). The fraction of solution to be discharged (87) depended on the water balance and varied considerably according to concentrate.

In the HCN stripper (92), the acidified barren was stripped with air (107) under reduced pressure to help volatilize HCN into the gas phase, and thus remove cyanide from the solution as far as possible. The stripper produced an HCN vapor (93) and a solution (96) low in cyanide. The low cyanide solution was processed through a cyanide destruct circuit (90) using either $SO_2$ or peroxide as the oxidant (111), air (110), and copper sulphate or nickel sulphate (108), according to known technology. Slaked lime (109) was used to raise and maintain the pH between 8 and 9. The gypsum precipitate (102) from the cyanide destruct circuit was filtered (98) and disposed to tailings with the cyanidation residue.

HCN vapor from the HCN stripper was absorbed in a caustic solution, maintained at a pH of 11-12, and then scrubbed with additional caustic. In this circuit (94), the HCN was converted back to NaCN and re-entrained into the solution. The scrubbed gas from absorption was vented to atmosphere (123). The cyanide-rich solution (121) was combined with acid stream (86) and neutralized to pH 11 using caustic solution (119). The neutralized NaCN recycle solution (73) was recycled into the cyanide pressure vessel.

A summary of the key results for each concentrate can be found in Table 10 below.

TABLE 10

Results from Continuous Precious Metal Extraction Operations

|  | Conc I | Conc III | Conc IV |
|---|---|---|---|
| Flotation step? | NO | NO | YES |
| g/L solids in PCN vessel | 150 | 400 | 150 |
| delta Cu across PCN (mg/L) | 220 | 220 | 110 |
| % Cu in feed solids | 1.29% | 1.11% | 1.04% |
| % Cu leaching (relative) | 14% | 5.4% | 6.6% |
| delta SCN across PCN (mg/L) | 600 | 280 | 400 |
| % S in feed solids | 32.4% | 27.30% | 52.8% |
| % S leaching (relative) | 1.2% | 0.22% | 0.5% |
| total NaCN in PCN vessel discharge (mg/L) | 3000 | 2800 | 2700 |
| Volume of Barren treated for Cu/SCN removal (liters/kg solid) | 2.5 | 0.7 | 1.4 |
| % of acidified barren to stripper/CN destruct | 60% | 100% | 37% |
| Net NaCN consumption (kg/t) | 5.4 | 2.4 | 2.8 |
| Gold Recovery across gold plant | 82% | 88.8% | 90.6% |
| Silver Recovery across gold plant | 86% | 82.9% | 90.8% | c) Conclusions

The Cu leaching in PCN varied from a low of 5% with Concentrate III to a high of 15% with Concentrate IV. SCN production in PCN varied even more, from a low of 0.22% in Concentrate III up to 1.2% with Concentrate I.

Consequently the g/L solids in PCN was (deliberately) varied inversely from 150 g/L to 400 g/L Also the net cyanide consumption varied from 2.4 kg/t to 5.4 kg/t The volume of barren solution being treated through the AVR circuit for Cu and SCN removal, varied from 0.7 liters/kg solids up to 2.5 liters/kg solids, due to the varying amount of Cu and SCN leached in PCN.

The split of acidified barren sent to stripping and cyanide destruct varied from 37% up to 100%.

This illustrates the flexibility of the new process to various feed materials, so as to obtain optimum results and minimize costs.

Example 12

Effect of Free Acid in Autoclave Discharge on Copper Leaching in Cyanidation

This example describes the effect of acid level in the autoclave discharge on copper leaching in cyanidation.
a) Copper Leaching—Pilot Scale Continuous Mode Copper concentrate I, (Table 1), was subjected to the continuous copper extraction process as described in Example 8. Before filtering and washing, a 3 L sample of autoclave slurry was collected from the flash tank overflow valve during operations. The sample was vacuum filtered and repulped with 1 L of CCD wash solution of composition (0.6 g/L copper, 3.8 g/L free acid, 6.1 g/L chloride, 0.6 g/L iron). This repulped slurry was filtered and repulped again with an additional 1 L of CCD wash solution. After filtering once more, the cake was submitted for cyanidation testing. Samples were taken on several consecutive days, as the acid levels in the autoclave were purposely varied from 9 to 17 g/L.

Figure 5:
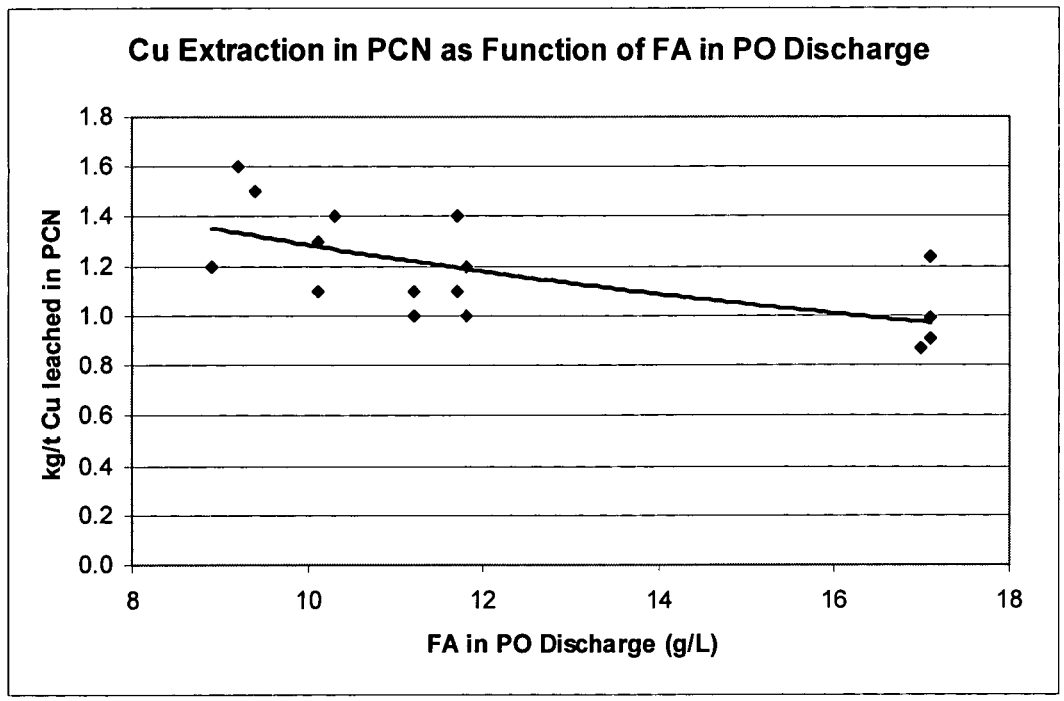
FIG. 5 is a graphical illustration showing copper extraction during pressure cyanidation as a function of free acid in autoclave discharge.

The resultant residues averaged 1.25% Cu, although ranged from 1.15% to 1.44% copper. Gold averaged 10.2 g/t Au, and silver 47 g/t Ag.
b) Gold and Silver Leaching—Batch Pressure Leach Cyanidation of the copper extraction residues were done under pressurized conditions as described in Example 6. Gold leaching averaged 86.4%, thiocyanate formation 2.4 kg SCN/t feed solids, and copper leaching 1.2 kg Cu/t feed solids. Table 11 shows the copper results for each test, and FIG. 5 shows these graphically.

TABLE 11

Effect of Autoclave Discharge Acid on Copper Leaching in Cyanidation

| PCN # | Acid in PO Discharge g/L | Total Cu in PCN feed % | Cu in PCN res % | ppm Cu in solution ppm | kg of Cu/t solids kg/t |
|---|---|---|---|---|---|
| 3240 | 11.7 | 1.15 | 1.03 | 271 | 1.4 |
| 3241 | 11.7 | 1.27 | 1.05 | 283 | 1.1 |
| 3242 | 11.2 | 1.33 | 1.13 | 283 | 1.1 |
| 3245 | 11.2 | 1.17 | 1.01 | 292 | 1.1 |
| 3247 | 11.8 | 1.13 | 0.92 | 241 | 0.9 |
| 3248 | 11.8 | 1.06 | 0.94 | 262 | 1 |
| 3249 | 11.8 | 1.44 | 1.14 | 288 | 1.1 |
| 3251 | 9.4 | 1.23 | 1.01 | 362 | 1.4 |
| 3255 | 8.9 | 1.20 | 1.02 | 282 | 1.2 |
| 3257 | 9.2 | 1.29 | 1.04 | 414 | 1.6 |
| 3259 | 10.1 | 1.38 | 1.07 | 271 | 1.1 |
| 3260 | 10.1 | 1.38 | 1.04 | 314 | 1.3 |
| 3261 | 10.3 | 1.22 | 1.12 | 346 | 1.4 |
| 3263 | 17.0 | 1.23 | 1.21 | 370 | 0.9 |

TABLE 11-continued

Effect of Autoclave Discharge Acid on Copper Leaching in Cyanidation

| PCN # | Acid in PO Discharge g/L | Total Cu in PCN feed % | Cu in PCN res % | ppm Cu in solution ppm | kg of Cu/t solids kg/t |
|---|---|---|---|---|---|
| 3265 | 17.1 | 1.32 | 1.29 | 222 | 0.9 |
| 3266 | 17.1 | 1.23 | 1.13 | 240 | 1.2 |
| 3267 | 17.1 | 1.23 | 1.17 | 248 | 1.0 |

Tests operated at 250 g/L solids c) Conclusions

There was no correlation between acid levels in the autoclave discharge solution and copper in the copper plant residue. However, copper leaching in cyanidation decreased as the acid in the autoclave discharge increased. This would indicate that the higher acid for the process variation where there is no subsequent atmospheric leach after pressure oxidation, is beneficial to the cyanidation plant.

Example 13

Formation of Thiocyanate During Continuous Operations

The formation of SCN during gold and silver extraction is not confined solely to the pressure cyanidation, (PCN) operation, as any contact of residue with a cyanide solution can generate this species.

To illustrate this point, further details are described within the present example.

Copper concentrate I was subjected to the copper extraction to first remove the copper, followed by gold/silver extraction using pressure cyanidation as described in Example 8. Throughout operations of the gold leach, samples were taken, filtered, and assayed to determine the thiocyanate formation profile within the circuit.

Table 12 shows the amount of SCN is calculated in the feed slurry tank (before PCN) as well as the product slurry tank (after PCN but before filtering).

Approximately one half of the total SCN production actually occurs in these two tanks, i.e. 49% of the total SCN.

TABLE 12

Thiocyanate formation throughout Continuous Gold Plant

| Unit Operation | Overall Effective ΔSCN | % of Overall ΔSCN Formed | % of Overall Retention Time |
|---|---|---|---|
| Feed System | 217 | 37% | 53% |
| Pressure Vessel (120 min retention time) | 298 | 51% | 27% |
| Filtration Feed Tank | 68 | 12% | 20% |

Figure 6:
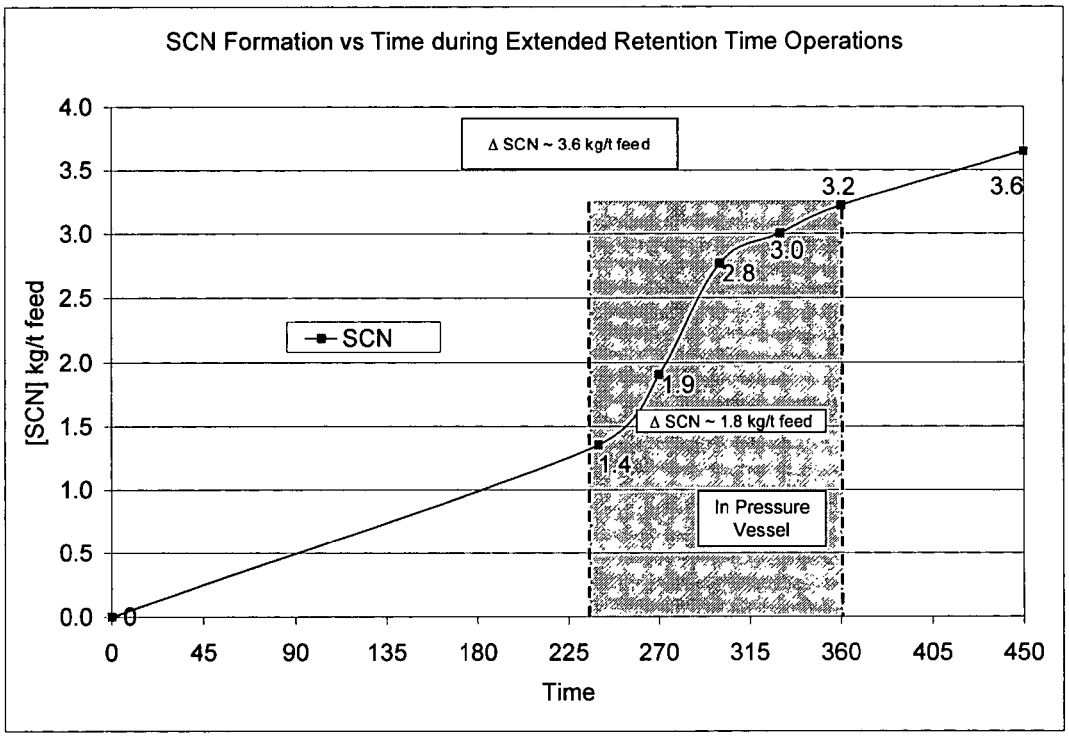
FIG. 6 is a graphical illustration showing thiocyanate formation as a function of time in a pressure cyanidation circuit.

It is therefore important that the contact time between solids and cyanide solution in the peripheral equipment is minimized. FIG. 6 shows the formation rates of SCN throughout the cyanidation process. The portion of the graph between the parallel stippled lines is the time in the pressure vessel (120 minutes in this Example).

It will be appreciated that the method of minimizing thiocyanate production during cyanidation is not restricted to a residue obtained from a halide-assisted hydrometallurgical process but can be applied to other feed materials, such as gold/silver bearing residues obtained from other hydrometallurgical processes, particularly those residues that also contain elemental sulphur and/or cyanide soluble copper. The formation of thiocyanate is minimized by reducing the duration of cyanidation so that the thiocyanate has less time to form. At the same time, the leaching of the precious metal is enhanced by effecting the cyanidation at an elevated oxygen pressure which compensates for the shorter duration of cyanidation in that less cyanidation leaching time is required for effective leaching of the precious metal. Surprisingly, it has been found that the thiocyanate formation can be minimized in this way despite the elevated oxygen pressure so employed. In this way the precious metal is selectively leached as opposed to the formation of thiocyanate.

Although certain preferred embodiments of the present invention have been shown and described in detail, it should be understood that various changes and modifications may be made therein without departing from the scope of the appended claims.

The claims which follow are to be considered an integral part of the present disclosure. The term "comprises" or "comprising", as used herein and in the claims, has its customary non-restrictive meaning which denotes that in addition to any items to which the term relates, there may be included additional items not specifically mentioned.

DEFINITION OF TERMS

Of interest to this invention are the following terms:
Free cyanide
Weak acid dissociable (WAD) cyanide
Total cyanide
Titrated cyanide
Active cyanide Note that the last two of these, Titrated and Active Cyanide, are terms used by the applicant and defined in this document, but are not in common use.

The other terms are in popular use within the cyanidation industry.

A good source of information on cyanide definitions and analytical methods can be found in the website of the International Cyanide Management Institute:
http://www.cyanidecode.org/cyanide_sampling.php Information or definitions extracted and copied literally from the above source are shown in italics below.

Other comments made for further clarity (by the inventor) are shown in normal type.

*Free Cyanide: Only hydrogen cyanide and the cyanide ion in solution can be classed as "free" cyanide.*

Free cyanide is normally not determined by titration of actual process solutions such as used in this invention, because the commonly used titration procedure also decomposes some (copper) cyanide complexes, thus giving a false high value.

*Total Cyanide: This measurement of cyanide includes all free cyanide, all dissociable cyanide complexes and all strong metal cyanide including ferro-cyanide $Fe(CN)_6^{-4}$, ferri-cyanide $Fe(CN)_6^{-3}$, and portions of hexacyano cobaltate $Co(CN)_6^{-3}$ and those of gold and platinum. Only the related or derived compounds cyanate ($CNO^-$) and thiocyanate ($SCN^-$) are excluded from the definition of total cyanide*

In practice Total cyanide is determined by an analytical procedure similar to that used for WAD cyanide, except the distillation is done from a stronger acid solution, which is more effective at breaking down strong cyanide complexes, such as those listed in the previous paragraph. In the context of the examples quoted in this specification, such strong complexes are rare or non-existent as far as is known, so WAD cyanide and Total cyanide methods give essentially the same result on these examples.

Titrated Cyanide: A measure of free cyanide and easily decomposed copper cyanide complexes. This is measured by titration of a sample with $AgNO_3$ solution using a KI indicator, essentially using the free cyanide method, knowingly in the presence of copper cyanides.

The proportion of copper cyanides complexes that decompose during this titration, (and thus contribute to the measurement), is not known precisely, but it is believed that the tetra- and tri-cyano complexes, $[Cu(CN)_4]^{3-}$ ions and $[Cu(CN)_3]^{-2}$ ions, both decompose in this titration to liberate free cyanide, and possibly a portion of the $[Cu(CN)_2]^{1-}$ ions also decompose in the titration. Whatever the actual chemistry is during the titration, the result is useful as a measure of the combined free cyanide and copper complexed cyanide, and has been used as such for experiments in which this parameter is monitored, (e.g. Example 3 above)

Active Cyanide: A measure of free cyanide that is calculated by the inventor, using the Total cyanide titration and subtracting out all cyanide associated with soluble Cu, assuming that such Cu cyanide complexes are only in the tetracyanide form, $[Cu(CN)_4]^{3-}$.

To determine Active cyanide concentration in solution it is therefore necessary to deduct four times the copper concentration [Cu] from the Total cyanide, on a molar basis:

The weight ratio of 4 moles of NaCN (Molecular weight=49.0075), to one mole of Cu (MW=63.546) is 3.08. (4×49.0075=196.030; 196.030/63.546=3.085).

Therefore Active Cyanide=Total cyanide−3.085×[Cu].

If other interfering metal ions are present, such as zinc, which also forms weak-acid dissociable cyanide complexes like copper, the formula would be amended accordingly. However, in all the examples in this specification, copper is the only significant metal ion present in the process solutions which forms such complexes.

What is claimed is:

1. A process for the extraction of a precious metal from a sulphide ore or concentrate or other feed material amenable to pressure oxidation, comprising:
    subjecting the feed material to pressure oxidation to produce a pressure oxidation slurry;
    subjecting the slurry to a liquid-solid separation step to obtain a pressure oxidation solution and a solid residue containing elemental sulphur and the precious metal; and
    subjecting the solid residue to cyanidation to leach the precious metal into solution, wherein formation of thiocyanate during said cyanidation is minimized or counteracted by effecting said cyanidation at an elevated oxygen pressure of about 1000 to 10,000 kPa guage with respect to atmospheric pressure so as to reduce duration of the cyanidation while still leaching a major portion of the precious metal during said reduced duration of the cyanidation.

2. The process of claim 1, wherein the pressure oxidation is carried out at an elevated temperature of about 125° C. to 160° C. and pressure of at least 1000 kPa gauge in the presence of an aqueous solution containing halide ions.

3. The process of claim 1, wherein the duration of the cyanidation is a maximum of about 300 minutes.

4. The process of claim 1, wherein said pressure oxidation is carried continuously.

5. The process of claim 2, further comprising the step of flashing the slurry down to a lower temperature and pressure.

6. The process of claim 5, wherein said flashing is carried out continuously.

7. The process of claim 5, wherein the pressure oxidation is carried out at a temperature above the melting point of elemental sulphur and wherein the lower temperature to which said flashing of said slurry is effected, is below the melting point of elemental sulphur.

8. The process of claim 7, wherein the lower temperature is about 95° C. to 102° C.

9. The process of claim 1, wherein the solid residue containing the elemental sulphur and the precious metal is subjected to said cyanidation absent an intervening sulphur removal step.

10. The process of claim 2, wherein the halide ions are selected from one or more of the group consisting of chloride and bromide.

11. The process of claim 2, wherein the halide ions comprise chloride.

12. The process of claim 1, wherein the feed material also contains copper, resulting in the solid residue from the pressure oxidation slurry also containing copper, and wherein this first residue, prior to said cyanidation, is subjected to acid leaching with an acidic leach solution to dissolve at least some of the copper contained in the first residue to produce a copper solution and a second residue and to minimize the cyanide-soluble component of the copper in said second residue.

13. The process of claim 12, wherein copper is extracted from the copper solution by solvent extraction.

14. The process of claim 12, wherein the acidic leach solution also contains halide ions.

15. The process of claim 14, wherein the halide ions are selected from one or more of the group consisting of chloride and bromide.

16. The process of claim 14, wherein the halide ions comprise chloride.

17. The process of claim 16, wherein said acid leaching is effected in the presence of about 2 to 10 g/l chloride.

18. The process of claim 11, wherein the pressure oxidation is effected in the presence of about 4 to 25 g/l chloride.

19. The process of claim 12, wherein the acid leaching is effected at an elevated temperature.

20. The process of claim 19, wherein the acid leaching is effected at a temperature of about 40° C. to 95° C.

21. The process of claim 12, wherein said acid leaching is effected with a retention time of about 0.5 to 4 hours.

22. The process of claim 12, wherein said acid leaching is carried out with sufficient acid concentration so that the resulting copper solution has a pH of about 0.5 to 1.5.

23. The process of claim 1, wherein the feed material also contains acid-soluble copper minerals and wherein the pressure oxidation is carried out with sufficient acid concentration in the pressure oxidation solution to produce a final pH of no more than 1.5, thereby to minimize the acid-soluble copper minerals in the residue.

24. The process according to claim 23, wherein the final pH is between about 0.5 and 1.5.

25. The process of claim 23, wherein copper is extracted from the pressure oxidation solution by means of solvent extraction prior to said cyanidation.

26. The process of claim 1, wherein, prior to said cyanidation, the solid residue from the pressure oxidation slurry is subjected to flotation to produce a flotation concentrate containing the elemental sulphur and the precious metal and a flotation tailings stream and subjecting the flotation concentrate to said cyanidation.

27. The process of claim 1, wherein said cyanidation is carried out at an elevated oxygen pressure in a pressure vessel with a retention time of about 30 to 90 minutes in the pressure vessel.

28. The process of claim 1, further comprising the step of maintaining a solids density of about 100 g/L to 600 g/L during said cyanidation.

29. The process of claim 1, wherein said cyanidation is carried out with an active cyanide concentration of at least equivalent to 500 mg/L NaCN, the active cyanide concentration being total cyanide concentration in solution minus cyanide required for complexation of any copper that is present as the tetracyano complex.

30. The process of claim 29, wherein the active cyanide concentration is equivalent to about 500 to 2000 mg/L NaCN.

31. The process of claim 1, wherein said cyanidation is carried out at a total cyanide concentration equivalent to about 1000 to 10,000 mg/L NaCN.

32. The process of claim 31, wherein the total cyanide concentration is equivalent to about 3000 to 4000 mg/L NaCN.

33. The process of claim 1, wherein said cyanidation produces a cyanidation slurry containing precious metal complexes and further comprising the step of subjecting the slurry to liquid/solid separation to produce a solid residue and a liquid containing the precious metal complexes.

34. The process of claim 33, further comprising the step of recovering the precious metals from said liquid to produce a resultant barren liquor.

35. The process of claim 34, wherein the precious metals are recovered by absorption onto activated carbon.

36. The process of claim 35, wherein the precious metals are recovered from the activated carbon by elution, electrowinning and subsequent refinement to bullion.

37. The process of claim 36, further comprising the step of removing copper, if present, from the barren liquor by acidifying with $H_2SO_4$ to decrease the pH of the barren liquor to precipitate the copper as CuCN and/or CuSCN solid.

38. The process of claim 37, further comprising the steps of filtering the CuCN and/or CuSCN solid from the barren liquor and raising the pH of the barren liquor with alkali and thereafter recycling the barren liquor to the cyanidation.

39. The process of claim 38, further comprising the step of recycling the CuCN and/or CuSCN to the pressure oxidation.

40. The process of claim 38, further comprising the step of splitting a bleed stream from the barren liquor prior to said raising of the pH of the barren liquor and recovering cyanide from said bleed stream in the form of a NaCN solution.

41. The process of claim 40, further comprising the step of raising the pH of the NaCN solution and recycling the NaCN solution to the cyanidation.

42. The process of claim 40, further comprising the step of subjecting the bleed stream, after recovering cyanide therefrom, to oxidation, whereby any strong acid dissociable cyanide species in the bleed stream is oxidized to cyanate.

43. A method of minimizing thiocyanate formation during recovery of a precious metal from a sulphide ore or concentrate or other feed material amenable to pressure oxidation, comprising:
subjecting the ore or concentrate to pressure oxidation to produce a pressure oxidation slurry;
subjecting the slurry to a liquid-solid separation step to obtain a pressure oxidation solution and a solid residue containing elemental sulphur and the precious metal; and
subjecting the solid residue to cyanidation to recover the precious metal, wherein formation of thiocyanate during said cyanidation is minimized by effecting said cyanidation at an elevated oxygen pressure of about 1000 to 10,000 kPa guage with respect to atmospheric pressure, thereby reducing duration of said cyanidation.

44. The method of claim 43, wherein the cyanidation has a maximum duration of 300 minutes.

45. The method of claim 44, wherein the cyanidation is carried out at an elevated oxygen pressure, with respect to atmospheric pressure, in a pressure vessel with a retention time of about 30 to 90 minutes in the pressure vessel.

46. The method of claim 44, wherein said cyanidation is carried out with an active cyanide concentration of at least 500 ppm NaCN, the active cyanide concentration being total cyanide concentration in solution minus cyanide required for complexation of copper as the tetracyano complex, if present.

47. The method of claim 45, wherein the active cyanide concentration is about 500 to 2000 ppm NaCN.

48. The method of claim 43, wherein said cyanidation is carried out at a total cyanide concentration of about 1000 to 10,000 ppm NaCN.

49. The method of claim 48, wherein the total cyanide concentration is about 3000 to 4000 ppm NaCN.

50. The method according to claim 43, wherein the pressure oxidation is carried out an elevated temperature of about 125° C. to 160° C. in the presence of an aqueous solution containing halide ions.

51. A method of minimizing thiocyanate formation during recovery of precious metal from a residue, containing the precious metal and elemental sulphur, produced by a hydrometallurgical process, comprising the step of subjecting the residue to cyanidation to leach the precious metal into solution, whereby wherein formation of thiocyanate during said cyanidation is minimized or counteracted by effecting said cyanidation at an elevated oxygen pressure of about 1000 to 10,000 kPa guage with respect to atmospheric pressure so as to reduce duration of the cyanidation while still leaching a major portion of the precious metal during said reduced duration of the cyanidation.

52. The method of claim 51, wherein the residue also contains cyanide-soluble copper and further comprising the step of, prior to said cyanidation, reducing the cyanide-soluble copper in the residue by subjecting the residue to acid leaching with an acidic leach solution at an elevated temperature of about 50° C. to 95° C. to produce a copper solution and an acid leach residue containing the precious metal.

53. The method of claim 1, wherein the cyanidation at an elevated oxygen pressure is effected at a temperature between about 5° C. to 35° C.

54. The method of claim 43, wherein the cyanidation at an elevated oxygen pressure is effected at a temperature between about 5° C. to 35° C.

55. The method of claim 51, wherein the cyanidation at an elevated oxygen pressure is effected at a temperature between about 5° C. to 35° C.

* * * * *